United States Patent
Saigusa et al.

(10) Patent No.: US 11,161,503 B2
(45) Date of Patent: Nov. 2, 2021

(54) VEHICULAR COMMUNICATIONS NETWORK AND METHODS OF USE AND MANUFACTURE THEREOF

(71) Applicant: Honda Motor Co., Ltd., Tokyo (JP)

(72) Inventors: Shigenobu Saigusa, West Bloomfield, MI (US); Yoichi Sugimoto, Tochigi (JP); Zeljko Medenica, Birmingham, MI (US)

(73) Assignee: HONDA MOTOR CO., LTD.

( * ) Notice: Subject to any disclaimer, the term of this patent is extended or adjusted under 35 U.S.C. 154(b) by 458 days.

(21) Appl. No.: 16/058,763

(22) Filed: Aug. 8, 2018

(65) Prior Publication Data

US 2018/0345961 A1   Dec. 6, 2018

Related U.S. Application Data

(63) Continuation of application No. 15/191,358, filed on Jun. 23, 2016, now Pat. No. 10,081,357.

(51) Int. Cl.
*B60W 30/095* (2012.01)
*G08G 1/0967* (2006.01)
(Continued)

(52) U.S. Cl.
CPC ........ *B60W 30/0956* (2013.01); *B60W 30/09* (2013.01); *B60W 30/095* (2013.01);
(Continued)

(58) Field of Classification Search
CPC ....... B60W 30/0956; B60W 30/18163; B60W 30/095; B60W 30/09; B60W 2554/80;
(Continued)

(56) References Cited

U.S. PATENT DOCUMENTS 3,725,921 A    4/1973 Weidman et al.
4,361,202 A   11/1982 Minovitch
(Continued)

FOREIGN PATENT DOCUMENTS

CN    103026397 A    4/2013
CN    105593700 A    5/2016
(Continued)

OTHER PUBLICATIONS

Office Action of U.S. Appl. No. 15/630,864 dated Jan. 22, 2019, 46 pages.
(Continued)

*Primary Examiner* — Rami Khatib
(74) *Attorney, Agent, or Firm* — Rankin, Hill & Clark LLP

(57) ABSTRACT

A vehicle control system for use with a host vehicle configured for travel along a path is described. The vehicle control system includes a processor configured to access a host location and host speed of the host vehicle. The processor is also configured to detect a follower location and follower speed of a following vehicle behind the host vehicle on the path. A tailgating distance is calculated between the host vehicle and the following vehicle. The following vehicle is identified as a tailgating vehicle when the tailgating distance is less than or equal to a first warning distance or when the follower speed is greater than the host vehicle within a second warning distance. A tailgating protocol of the host vehicle is initiated for the tailgating vehicle based on a differential speed between the host speed and the follower speed.

14 Claims, 14 Drawing Sheets

(51) Int. Cl.
  *G08G 1/01* (2006.01)
  *B60W 30/18* (2012.01)
  *G08G 1/16* (2006.01)
  *B60W 30/09* (2012.01)

(52) U.S. Cl.
  CPC ..... *B60W 30/18163* (2013.01); *G08G 1/0112* (2013.01); *G08G 1/0116* (2013.01); *G08G 1/0133* (2013.01); *G08G 1/0141* (2013.01); *G08G 1/096725* (2013.01); *G08G 1/096758* (2013.01); *G08G 1/096775* (2013.01); *G08G 1/096791* (2013.01); *G08G 1/161* (2013.01); *G08G 1/164* (2013.01); *G08G 1/166* (2013.01); *B60W 2554/4041* (2020.02); *B60W 2554/80* (2020.02); *B60W 2554/801* (2020.02); *B60W 2554/804* (2020.02); *B60W 2556/00* (2020.02); *B60W 2556/55* (2020.02); *B60W 2556/65* (2020.02); *B60W 2720/10* (2013.01)

(58) Field of Classification Search
  CPC ..... B60W 2554/801; B60W 2554/804; B60W 2554/4041; B60W 2556/00; B60W 2556/55; B60W 2556/65; B60W 2720/10; G08G 1/096775; G08G 1/0133; G08G 1/0112; G08G 1/0116; G08G 1/164; G08G 1/161; G08G 1/096725; G08G 1/096758; G08G 1/0141; G08G 1/096791; G08G 1/166
  See application file for complete search history.

(56) References Cited

U.S. PATENT DOCUMENTS

| | | |
|---|---|---|
| 4,807,101 A * | 2/1989 | Milde, Jr. ............... B60Q 1/46 340/472 |
| 5,166,681 A | 11/1992 | Bottesch et al. |
| 5,189,619 A | 2/1993 | Adachi et al. |
| 5,229,941 A | 7/1993 | Hattori |
| 5,428,544 A | 6/1995 | Shyu |
| 5,777,451 A | 7/1998 | Kobayashi et al. |
| 5,928,294 A | 7/1999 | Zelinkovsky |
| 5,983,161 A | 11/1999 | Lemelson et al. |
| 6,032,097 A | 2/2000 | Iihoshi et al. |
| 6,249,232 B1 | 6/2001 | Tamura et al. |
| 6,278,360 B1 | 8/2001 | Yanagi |
| 6,292,725 B1 | 9/2001 | Kageyama et al. |
| 6,332,354 B1 | 12/2001 | Lalor et al. |
| 6,370,461 B1 | 4/2002 | Pierce et al. |
| 6,470,986 B2 | 10/2002 | Fuchs et al. |
| 6,615,137 B2 | 9/2003 | Lutter et al. |
| 6,650,252 B2 | 11/2003 | Miller, Jr. |
| 6,681,157 B2 | 1/2004 | Kageyama |
| 6,737,963 B2 | 5/2004 | Gutta et al. |
| 6,765,495 B1 | 7/2004 | Dunning et al. |
| 6,853,906 B1 | 2/2005 | Michi et al. |
| 6,985,089 B2 | 1/2006 | Liu et al. |
| 7,191,049 B2 | 3/2007 | Yajima |
| 7,295,925 B2 | 11/2007 | Breed et al. |
| 7,382,274 B1 | 6/2008 | Kermani et al. |
| 7,383,121 B2 | 6/2008 | Shinada |
| 7,471,212 B2 | 12/2008 | Krautter et al. |
| 7,554,435 B2 | 6/2009 | Tengler et al. |
| 7,617,041 B2 | 11/2009 | Sera |
| 7,877,187 B2 | 1/2011 | Hori et al. |
| 7,945,369 B2 | 5/2011 | Lindqvist et al. |
| 7,990,286 B2 | 8/2011 | Shankwitz et al. |
| 8,145,368 B2 | 3/2012 | Won et al. |
| 8,204,678 B2 | 6/2012 | Matsuno |
| 8,384,531 B2 | 2/2013 | Szczerba et al. |
| 8,396,642 B2 | 3/2013 | Breuer |
| 8,527,174 B2 | 9/2013 | Watanabe et al. |
| 8,620,517 B2 | 12/2013 | Caveney et al. |
| 8,788,134 B1 | 7/2014 | Litkouhi et al. |
| 8,818,681 B1 | 8/2014 | Dolgov et al. |
| 8,818,682 B1 | 8/2014 | Dolgov et al. |
| 8,903,588 B2 | 12/2014 | Schmüdderich et al. |
| 8,942,864 B2 | 1/2015 | Nemoto |
| 8,942,904 B2 | 1/2015 | Foerster et al. |
| 8,948,995 B2 | 2/2015 | Pandita et al. |
| 9,092,986 B2 | 7/2015 | Salomonsson et al. |
| 9,272,711 B1 * | 3/2016 | Sivaraman ............. G08G 1/166 |
| 9,403,436 B1 | 8/2016 | Yamada |
| 9,576,483 B2 | 2/2017 | Maass |
| 9,632,507 B1 | 4/2017 | Korn |
| 9,799,224 B2 | 10/2017 | Okamoto |
| 9,896,100 B2 | 2/2018 | Gordon et al. |
| 9,977,430 B2 | 5/2018 | Shalev-Shwartz et al. |
| 2002/0091479 A1 | 7/2002 | Maruko et al. |
| 2003/0043033 A1 | 3/2003 | Lee |
| 2003/0060936 A1 | 3/2003 | Yamamura et al. |
| 2003/0218564 A1 | 11/2003 | Tamatsu et al. |
| 2004/0073356 A1 | 4/2004 | Craine |
| 2005/0134441 A1 * | 6/2005 | Somuah ................ B60Q 1/503 340/435 |
| 2005/0195383 A1 | 9/2005 | Breed et al. |
| 2006/0028328 A1 * | 2/2006 | Cresse .................. G01S 17/931 340/435 |
| 2006/0162985 A1 | 7/2006 | Tanaka et al. |
| 2006/0284760 A1 | 12/2006 | Natsume |
| 2007/0021876 A1 | 1/2007 | Isaji et al. |
| 2007/0096885 A1 | 5/2007 | Cheng et al. |
| 2007/0135989 A1 | 6/2007 | Hengst |
| 2007/0142995 A1 | 6/2007 | Wotlermann |
| 2007/0159354 A1 | 7/2007 | Rosenberg |
| 2007/0241874 A1 | 10/2007 | Okpysh et al. |
| 2007/0276600 A1 | 11/2007 | King et al. |
| 2008/0172153 A1 | 7/2008 | Ozaki et al. |
| 2009/0099745 A1 | 4/2009 | Karnjate et al. |
| 2009/0256698 A1 * | 10/2009 | Bonilla .................. B60Q 1/525 340/479 |
| 2010/0066562 A1 | 3/2010 | Stählin et al. |
| 2010/0100324 A1 | 4/2010 | Caminiti et al. |
| 2010/0204896 A1 | 8/2010 | Biondo et al. |
| 2010/0214085 A1 | 8/2010 | Avery et al. |
| 2010/0256852 A1 | 10/2010 | Mudalige |
| 2010/0302371 A1 * | 12/2010 | Abrams ............... G08G 1/0175 348/149 |
| 2011/0018737 A1 | 1/2011 | Hsu et al. |
| 2011/0032119 A1 | 2/2011 | Pfeiffer et al. |
| 2011/0109475 A1 | 5/2011 | Basnayake et al. |
| 2011/0184605 A1 | 7/2011 | Neff |
| 2012/0166057 A1 * | 6/2012 | Amato ................ B60W 10/198 701/96 |
| 2012/0229302 A1 | 9/2012 | Sri-Jayantha |
| 2012/0306634 A1 | 12/2012 | Tsuda et al. |
| 2012/0310518 A1 | 12/2012 | Chen et al. |
| 2013/0041567 A1 | 2/2013 | Yamashiro |
| 2013/0041576 A1 | 2/2013 | Switkes et al. |
| 2013/0054127 A1 | 2/2013 | Yamashiro |
| 2013/0057397 A1 * | 3/2013 | Cutler ................ B62D 15/0255 340/435 |
| 2013/0060443 A1 | 3/2013 | Shida |
| 2013/0116859 A1 | 5/2013 | Ihlenburg et al. |
| 2013/0116861 A1 | 5/2013 | Nemoto |
| 2013/0211624 A1 | 8/2013 | Lind et al. |
| 2014/0005906 A1 | 1/2014 | Pandita et al. |
| 2014/0005908 A1 | 1/2014 | Kollberg et al. |
| 2014/0142797 A1 | 5/2014 | Otake |
| 2014/0222280 A1 | 8/2014 | Salomonsson et al. |
| 2014/0236449 A1 | 8/2014 | Horn |
| 2014/0257665 A1 | 9/2014 | Kagerer et al. |
| 2014/0278052 A1 | 9/2014 | Slavin et al. |
| 2014/0297118 A1 | 10/2014 | Eberling |
| 2014/0309884 A1 | 10/2014 | Wolf |
| 2014/0358414 A1 | 12/2014 | Ibrahim et al. |
| 2014/0368324 A1 | 12/2014 | Seifert |
| 2015/0100192 A1 | 4/2015 | Lee et al. |
| 2015/0130607 A1 | 5/2015 | MacArthur |
| 2015/0194055 A1 | 7/2015 | Maass |
| 2015/0199905 A1 | 7/2015 | Hayee et al. |
| 2015/0258996 A1 | 9/2015 | Victor et al. |
| 2015/0321699 A1 | 11/2015 | Rebhan et al. |

(56) References Cited

U.S. PATENT DOCUMENTS

| | | |
|---|---|---|
| 2016/0054735 A1 | 2/2016 | Switkes et al. |
| 2016/0091897 A1 | 3/2016 | Nilsson et al. |
| 2016/0133130 A1 | 5/2016 | Grimm et al. |
| 2016/0200318 A1 | 7/2016 | Parikh et al. |
| 2017/0072950 A1 | 3/2017 | Sim |
| 2017/0122841 A1 | 5/2017 | Dudar et al. |
| 2018/0032082 A1 | 2/2018 | Shalev-Shwartz et al. |
| 2018/0188735 A1 | 7/2018 | Sugawara et al. |

FOREIGN PATENT DOCUMENTS

| | | |
|---|---|---|
| DE | 10134367 A1 | 1/2003 |
| DE | 102009033800 A1 | 3/2010 |
| DE | 102009021476 A1 | 11/2010 |
| DE | 102009027535 A1 | 1/2011 |
| DE | 102011009483 A1 | 7/2012 |
| DE | 102011085012 A1 | 4/2013 |
| JP | H07334790 | 12/1995 |
| JP | 2000285395 | 10/2000 |
| JP | 2012083995 | 4/2012 |
| WO | WO1998/032030 | 7/1998 |

OTHER PUBLICATIONS

Office Action of U.S. Appl. No. 15/784,109 dated Oct. 28, 2019, 16 pages.

Notice of Allowance of U.S. Appl. No. 15/784,111 dated Feb. 19, 2020, 9 pages.

Office Action of U.S. Appl. No. 15/630,866, dated Oct. 4, 2018; 12 pages.

Office Action of U.S. Appl. No. 15/784,109 dated Jul. 11, 2019, 48 pages.

Office Action of U.S. Appl. No. 15/784,111 dated Jul. 10, 2019, 48 pages.

Office Action of U.S. Appl. No. 15/784,111 dated Sep. 27, 2019, 12 pages.

Office Action of U.S. Appl. No. 15/784,109 dated Apr. 6, 2020, 11 pages.

Khan et al., Analyzing Cooperative Lane Change Models for Connected Vehicle, Information Systems and Machine Learning Lab, University of Hildesheim, Germany, 6 pages.

Mazda: Brake Assist and Electronic Brake Force Distribution; Active Safety Technology; 3 pages; http://www.mazda.com/en/innovation/technology/safety/active_safety/bk_ebd/; printed Nov. 10, 2017.

Tanida, Analysis of merging behavior at expressway merging sections; Proceedings of the 2016 International Conference on Traffic and Transport Psychology; Brisbane, Australia; Aug. 2-5, 2016, 2 pages.

Office Action of U.S. Appl. No. 15/630,864 dated Apr. 2, 2019, 11 pages.

Notice of Allowance of U.S. Appl. No. 15/679,068, dated Apr. 26, 2019; 49 pages.

Office Action of U.S. Appl. No. 16/357,930 dated Apr. 19, 2021, 48 pages.

Office Action of U.S. Appl. No. 16/357,930 dated Aug. 16, 2021, 25 pages.

Office Action of U.S. Appl. No. 16/569,865 dated Sep. 2, 2021, 57 pages.

\* cited by examiner

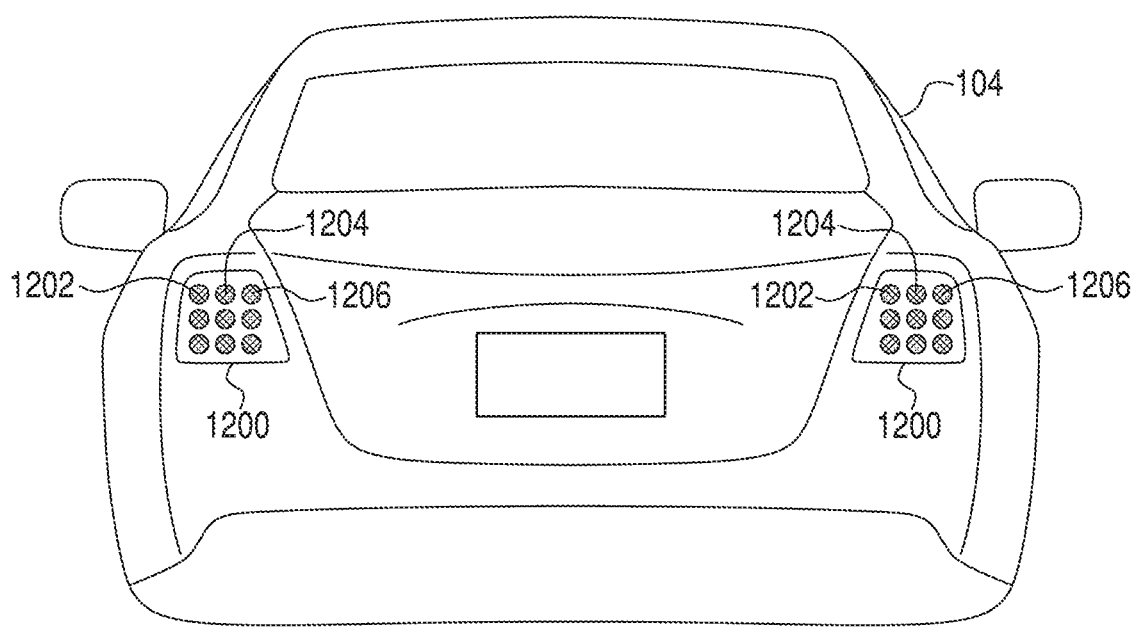

VEHICULAR COMMUNICATIONS NETWORK AND METHODS OF USE AND MANUFACTURE THEREOF

This application is a continuation of U.S. application Ser. No. 15/191,358 filed on Jun. 23, 2016 and published as U.S. Publication No. 2017/0369055 on Dec. 28, 2017, which is expressly incorporated herein by reference.

BACKGROUND

The disclosed subject matter relates to vehicular communications networks and methods of use and manufacture thereof. In particular, some embodiments relate to methods and apparatus for generating, transmitting, and/or receiving data along a vehicular communications network, as well as controlling, or assisting the control of, a subject vehicle based on this data.

The travel of a vehicle (hereinafter subject vehicle) along predetermined routes, such as on highways, roads, streets, paths, etc. (hereinafter generically referred to as paths) can be affected by other vehicles, objects, or obstructions (hereinafter generically referred to as other vehicles) on, at or otherwise in proximity to the path. Control of a vehicle on the path can be performed manually by a driver, automatically or semi-automatically by a driving control system, or a combination of a driver and a control system. The circumstances in which a vehicle's travel is affected can be numerous and diverse, and thus vehicle communications networks can be used to address these circumstances.

SUMMARY

As one example, one or more other vehicles disposed ahead of a subject vehicle that are either stopped or traveling at a slower speed (or that are decelerating at a higher rate of deceleration) than the subject vehicle may cause or otherwise require the subject vehicle to stop or reduce its speed to avoid a collision. The immediacy of this requirement to stop or reduce speed is dictated by the distance between the subject vehicle and the one or more other vehicles, as well as the difference in speeds therebetween (or projected difference in speed based on the difference in the rates of deceleration).

It may be beneficial to effectively determine the immediacy of the requirement for the subject vehicle to brake or slow down, such as under the above circumstances. For example, the subject vehicle will need to decelerate very rapidly (hereinafter hard brake) or change lanes if the one or more other vehicles are in close proximity to the subject vehicle and/or the speed discrepancy between the vehicles is high (or projected to be high), such as where the subject vehicle is traveling much faster (or projected to be traveling much faster) than the other vehicles ahead. However, hard braking may cause or otherwise involve certain disadvantages, such as causing passenger discomfort within the subject vehicle, increasing the potential of a collision (such as by a following vehicle colliding into the rear of the subject vehicle), etc. Changing lanes under these circumstances may be subject to similar disadvantages.

Thus, it may be generally preferable to avoid hard braking or changing lanes in situations where it is not necessary for collision avoidance. Hard braking avoidance necessarily involves identification of situations not warranting hard braking for collision avoidance, as contrasted with situations where such hard braking is prudent. This identification can be performed manually. Alternatively, sensors using radar or lidar technology can be mounted on vehicles to detect entities and/or other vehicles currently disposed in the subject vehicle's immediate path of travel for the purpose of warning the subject vehicle's operator to take action to avoid a collision in cases where the other vehicles disposed ahead of the subject vehicle are stopped or traveling more slowly than the subject vehicle. Vehicular operators may also utilize navigation systems that include global positioning systems (GPSs) and congested traffic alerts to determine currently effective routes of travel. Other vehicles ahead of the subject vehicle can thereby be monitored using these technologies for the purpose of helping to identify situations warranting hard braking of the subject vehicle.

Identification of situations warranting hard braking may be further complicated in cases where another vehicle, motorcycle, bicyclist, etc. intends to merge into the path ahead of the subject vehicle. When a merging vehicle enters an entrance ramp and signals an intention to merge, the subject vehicle operator must determine whether to accelerate, decelerate, or change lanes to maintain a safe distance between the operator's vehicle and the merging vehicle during the merging event.

It may also be necessary for the subject vehicle operator to observe other vehicles proximate the merging vehicle to maintain this safe distance. For example, a vehicle merging ahead of other vehicles may cause those other vehicles to reduce speed to avoid colliding with the merging vehicle. The subject vehicle traveling behind the other vehicles may thereby need to reduce speed to avoid colliding with those other vehicles.

Alternatively, a vehicle may merge onto a path behind other vehicles that are either stopped or traveling at a slower speed than the merging vehicle. The merging vehicle may then need to reduce its speed to avoid colliding with the other vehicles. A subject vehicle traveling behind the location on the path where the merging vehicle is merging (or anticipated to merge) may therefore need to reduce speed to avoid colliding with the merging vehicle, which itself is reducing speed based on the other vehicles ahead.

In many of the above and other scenarios, it may be beneficial to determine whether a vehicle is traveling behind the subject vehicle, and whether the vehicles are separated by a safe or otherwise relevant distance, such as by using the above sensors. For example, if the following vehicle is too close behind the subject vehicle, then it may be beneficial to provide the following vehicle with a warning to increase the distance separating the vehicles, such as by flashing the subject vehicle's rear lights.

It may also be beneficial to take the information disclosed above (such as with regard to a merging vehicle ahead of the subject vehicle) into account in addressing the following vehicle. For example, it may be particularly important to predict scenarios where the subject vehicle will need to reduce its speed, and to further reduce its speed slowly to avoid being rear ended by the following vehicle. Under these circumstances, the subject vehicle can predict the necessity for it to brake early, and thereby reduce the intensity of the braking, to reduce the likelihood of being rear ended by the following vehicle.

The above sensors can also be used to identify situations requiring hard barking involving merging vehicles in the above contexts, and can also be used with an adaptive cruise control (ACC) system. ACC systems can automatically control a speed of a vehicle by mechanically actuating the vehicle's accelerator or brake system. ACC systems typically include a distance measuring device and can sense a distance to a forward or preceding vehicle and then control a host vehicle (i.e., the vehicle equipped with the ACC system, hereinafter also subject vehicle) so as to maintain a predetermined distance between the subject vehicle and vehicles ahead on the path (preceding vehicles). ACC systems may also include an input device for inputting at least one of a target vehicle speed or a target distance. Some ACC systems also provide a warning feature in which the system alerts the vehicle operator to intervene manually when the system determines that conditions are such that braking needs exceed the capabilities of the ACC system (e.g., the preceding vehicle has stopped or decelerated rapidly). Another type of ACC system can prompt the vehicle operator to apply brakes if the extra braking that is needed is beyond the capability of the ACC system, and can include a collision warning.

Currently sensed data may be used to provide further guidance, such as for ACC systems or autonomous driving systems, to change vehicle speeds or travel routes in the above contexts. As one example, a certain route may be congested with traffic ahead of the subject vehicle. Real time data may be gathered and used to detect and monitor the speed and location of the forward vehicles constituting the traffic congestion. Real time data may also be used to detect and monitor the speed, acceleration, heading, etc. of one or more vehicles intending to merge into the traffic from an entrance route, or alternatively, a different lane or path within the same route. In other words, data from traffic vehicles and the one or more merging vehicles can be detected, gathered, and analyzed, and thus data can also be used to determine preferable autonomous or assisted controls and/or driver alerts for the subject vehicle.

As discussed above, when traffic congestion exists on the roadway, a merge into the traffic by a vehicle can cause traffic to slow down for the merging vehicle or alternatively cause the merging vehicle to slow down for the traffic. The slowing of preceding traffic or a merging vehicle can require the approaching subject vehicle to perform a hard braking action or rapid change of course to avoid a collision with the traffic and/or merging vehicle. This situation is especially poignant in situations where another vehicle is following behind the subject vehicle and separated by a very small or otherwise potentially unsafe distance, such as where hard braking of the subject vehicle could cause the following vehicle to collide with the rear of the subject vehicle.

It may therefore be beneficial to combine real time or current traffic data from multiple vehicles with a data analysis system to generate predictions of traffic movements in reaction to a merging vehicle. For example, anticipated or statistically derived movements or patterns of multiple vehicles in a vehicle communication network can be determined based on the real time data collected from one or multiple sources, and the relevance of these predicted movements or patterns can be analyzed by an ACC system in the approaching vehicle. It may also be beneficial to collect and analyze data relating to vehicles following the subject vehicle, such as vehicles following too closely.

It may also be beneficial to supplement the methods and apparatus for generating predictions of preceding traffic and merging vehicles on a path, with methods and apparatus for detecting and/or analyzing information relating to vehicles following the subject vehicle too closely, by using an ACC system that can generate commands to control a subject vehicle based on the predictions. For example, based on data received from forward traffic and the merging vehicle, the approaching vehicle's ACC system can generate a prediction that one or more of the preceding traffic vehicles will decelerate. The ACC system can generate a response to the effects of the merging vehicle and/or traffic congestion and command vehicle controls to decelerate the subject vehicle gradually, thereby avoiding hard or dangerous braking actions. The ACC system may also generate one or more traffic alerts to the operator of the host vehicle. The alerts could warn the operator of the merging vehicle and impending traffic congestion, and/or provide a suggestion to change course to a new lane or path on the roadway.

These alerts can also take into account a situation where another vehicle is following the subject vehicle too closely. Under these circumstances, it may be beneficial for the subject vehicle to request that the following vehicle increase the distance separating the two vehicles, and/or provide an even earlier or more urgent warning to the subject vehicle operator to apply braking early and slowly to reduce the likelihood of being rear ended.

Some embodiments are therefore directed to a vehicle control system for use with a host vehicle configured for travel along a path, and at least one source of host vehicle speed and location data, path navigation data relevant to navigation of the current path, and traffic data relevant to the host vehicle's location on the path. The vehicular control system can include a processor that is configured to: access the current path navigation data and host vehicle location and speed data that is provided by the at least one source, detect, using a vehicular communications network, data from a merging vehicle intending to merge into the path of the host vehicle, detect, using the vehicular communications network, data from preceding traffic in the path of the host vehicle, determine a speed and location of the merging vehicle intending to merge into the path of the host vehicle from data transmitted over the vehicular communications network, determine a speed and location of preceding traffic on the path of the host vehicle from data transmitted over the vehicular communications network, and predict whether the speed of the preceding traffic or the speed of the merging vehicle will slow down during the merge. The vehicular control system can also include a vehicle controller configured to receive an instruction from the processor to control a speed of the host vehicle based on the predicted speed of preceding traffic and the predicted speed of the merging vehicle.

Some other embodiments are directed to a vehicle control system for use with a host vehicle configured for travel along a path, and at least one source of host vehicle speed and location data, path navigation data relevant to navigation of the current path, and traffic data relevant to the host vehicle's location on the path. The vehicular control system can include at least one wireless transceiver that is configured to receive current path data relevant to a speed and a location of at least one traffic vehicle in traffic preceding the host vehicle and a speed and a location of a merging vehicle intending to merge into the path from a vehicular communications network; and an electronic storage medium that is configured to store at least one of the current path data, preceding traffic data, and data relevant to a merging vehicle. The vehicle control system can also include a processor that is configured to: detect, using the vehicle communications network, data from the merging vehicle intending to merge into the path of the host vehicle, detect, using the vehicle communications network, data from proceeding traffic in the path of the host vehicle, determine a speed and location of the merging vehicle intending to merge into the path of the host vehicle from data transmitted over the vehicular communications network, determine a speed and location of preceding traffic in proximity to the path of the host vehicle from data transmitted over the vehicular communications network, and predict whether the speed of the preceding traffic or the speed of the merging vehicle will slow down during the merge. The vehicle control system can further include a vehicle controller configured to receive an instruction to control a speed of the host vehicle based on the predicted speed of preceding traffic and the predicted speed of the merging vehicle.

Still other embodiments are directed to a method of predicting traffic conditions and controlling a host vehicle based on the predicted conditions for travel along a path, the method being implemented by a processor and a vehicle control system. The method can include: accessing current path data relevant to a location and speed the host vehicle; detecting data, from a vehicular communications network, from a merging vehicle intending to merge into the path of the host vehicle; detecting data, from the vehicular communications network, of preceding traffic in the path of the host vehicle; determining a speed and location of the merging vehicle from the data transmitted over the vehicle communications network; determining a speed and location of preceding traffic on the path of the host vehicle from the data transmitted over the vehicular communications network; predicting whether the speed of the preceding traffic or the speed of the merging vehicle will slow down during the merge; and controlling a speed of the host vehicle, using the vehicle control system, based on the predicted speed of preceding traffic and the predicted speed of the merging vehicle during the merge.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which:

FIGS. 12A, 12B, and 12C are schematics of a rear of a host vehicle displaying various warning indicators to a tailgating vehicle.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

I. Overall Vehicle Communication Network

Some of the disclosed embodiments relate to a vehicle communication network that is disclosed below in the context of a traffic scenario 100. A scenario may involve one or more vehicles on a roadway 102 and one or more vehicles on an entrance ramp 108. In the embodiments, the vehicles can include automobiles, trucks, vans, minivans, sport utility vehicles (SUVs), busses, recreational vehicles, amusement park vehicles, trams, golf carts, robotically controlled vehicles, automated drive vehicles, remote controlled vehicles, drones, motorcycles, scooters, mopeds, bicycles, ATVs, trains, trams, light rail trains, boats, personal watercraft, aircraft, helicopters, or any transport related entity. In fact, the various disclosed methods and apparatus are intended to be usable with any type of user and/or mode of transport that can travel along, or can be located in proximity to, any improved, unimproved, and/or unmarked route or path.

The disclosed vehicle communication network is intended to be implemented with any known, related art or later developed technologies. For example, the implemented technologies can involve Dedicated Short Range Communications (DSRC) networks (including but not limited to those types of networks currently used by some transport and traffic systems, such as for automatic toll collection), ad hoc networks, wireless access in vehicular environments (WAVE), cellular networks, Wi-Fi networks, and/or any other network protocol that can provide the desired functionalities.

Some of the embodiments are disclosed below in the context of a DSRC network, which is a short to medium range communications service that provides communications links with high data transfer rates with acceptable or minimal latency. Vehicles, users, and infrastructure equipped with DSRC systems may communicate with each other, with remote DSRC compatible transceivers over a network, or with roadside equipment (such as transport related infrastructure). The range of DSRC is typically about 300 meters, with some systems having a maximum range of about 1000 meters. DSRC in the United States typically operates in the 5.9 GHz range, from about 5.85 GHz to about 5.925 GHz, and the typical latency for DSRC is about 50 ms. Some DSRC systems communicate with vehicles operating at 100 miles per hour or less, but embodiments are intended to cover communications with vehicles traveling at any speed.

Figure 1:
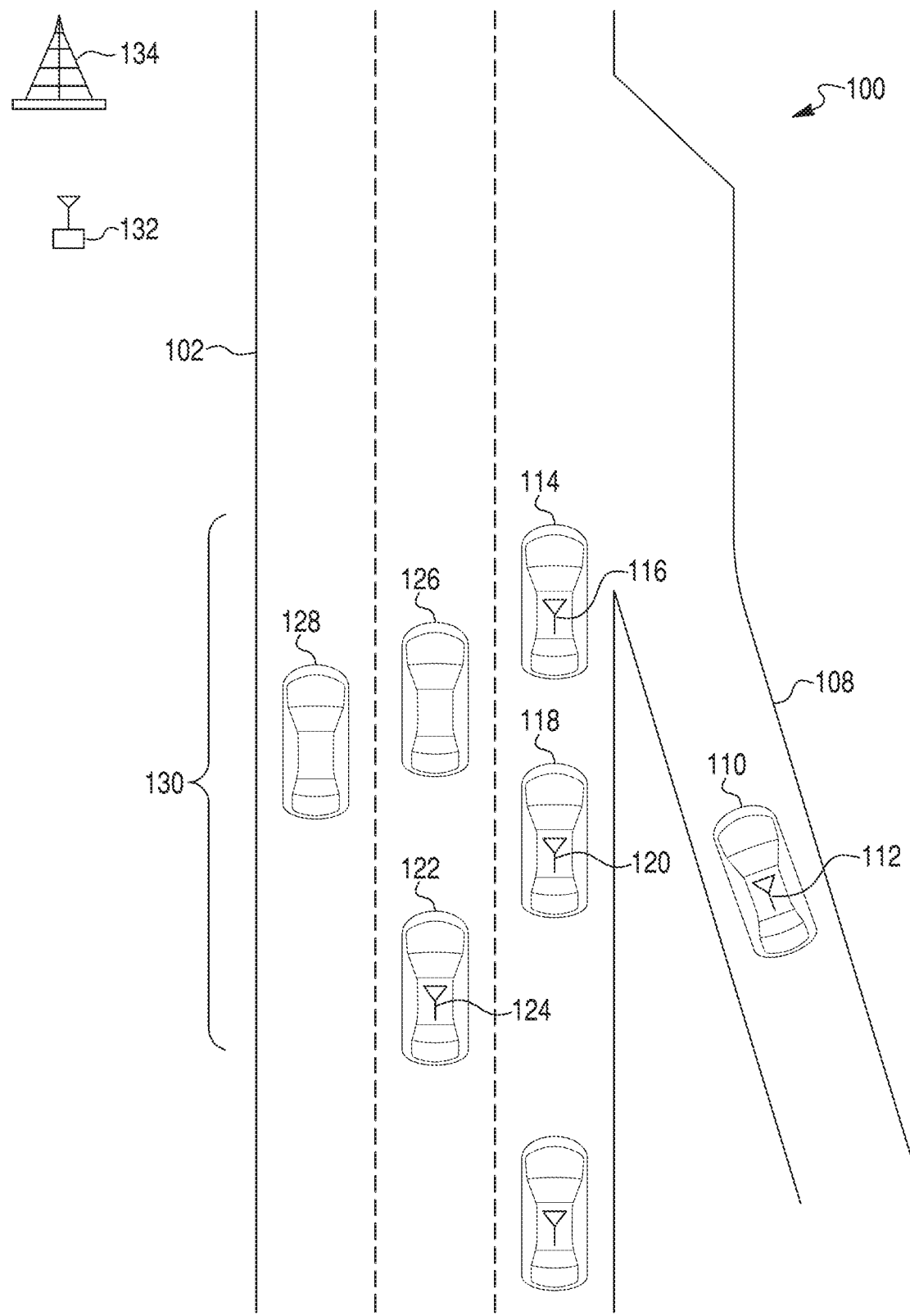
FIG. 1 is a schematic of a traffic scenario that involves a roadway with an entrance ramp for illustrating aspects of the embodiments.

FIG. 1 is a schematic of a traffic scenario 100 that involves a roadway 102 that may include a single lane or multiple lanes. Various infrastructure, vehicles, and vehicle communication network 200 (see FIG. 2) components can be disposed at or proximate the roadway 102, including a host vehicle 104, a remote vehicle 110, a first traffic vehicle 114, a second traffic vehicle 118, a third traffic vehicle 122, a roadside equipment (RSE) 132, and a wireless network antenna 134. A fourth traffic vehicle 126 and a fifth traffic vehicle 128 are not operable within the vehicle communication network 200 but are otherwise intermixed with the first traffic vehicle 114, the second traffic vehicle 118, and the third traffic vehicle 122, which are collectively identified as "traffic" 130 to facilitate explanation of the disclosure. To demonstrate the embodiments, remote vehicle 110 can be located on an entrance ramp 108 that merges into roadway 102 at any location. However, remove vehicle 110 could be located on any type of route or path that joins another route or path where vehicles can travel. The vehicles, roadways, entrance ramps, infrastructure, and components of the embodiments are provided for exemplary purposes to facilitate explanation of the disclosed ACC system 400 (see FIG. 4) and vehicle communication network 200, and alternative or additional features may be provided.

The host vehicle 104 can transmit, receive and/or exchange communications including data, images, messages, and/or other information with other vehicles or infrastructure using DSRC communications. The DSRC communications can be implemented between one DSRC transceiver to one or more other DSRC transceivers. The term "V2X" is also used to describe "vehicle-to-everything" communications, and variations of V2X designations may depend on the intended user that is transmitting DSRC signals.

As shown in FIG. 1, the host vehicle 104 may be equipped with a vehicle to vehicle (V2V) transceiver 106 that can exchange messages and information with other vehicles, users, or infrastructure equipped with DSRC transceivers. For example, the V2V transceiver 106 can communicate with the remote vehicle 110 via a V2V transceiver 112, the first traffic vehicle 114 via a V2V transceiver 116, the second traffic vehicle 118 via a V2V transceiver 120, and the third traffic vehicle 122 via a V2V transceiver 124. RSE 132 is equipped with a transceiver that can transmit and receive information wirelessly to and from any DSRC transceiver using vehicle to infrastructure (V2I) protocols.

The V2V transceiver 106 may include components for communicating various types of data and information between host vehicle 104 and other network connected vehicles, VRUs, infrastructure, and networks. Standard DSRC protocols require the exchange of relative positioning data of all the DSRC users within broadcast range. Additionally, vehicle communications may exchange data that can include, but is not limited to, the type and/or specifications of vehicle, navigation data, roadway hazard data, traffic location data, course heading data, course history data, projected course data, kinematic data, current vehicle position data, range or distance data, speed and acceleration data, location data, vehicle sensory data, vehicle subsystem data, and/or any other vehicle information. In various embodiments, host vehicle 104 may exchange data using DSRC protocols or other wireless protocols with any number of vehicles that have operational DSRC transceivers. For example, host vehicle 104, remote vehicle 110, and the first traffic vehicle 114 may be configured to exchange data and information wirelessly using V2V messages. Some of the embodiments are intended to include exchanging data and information between networked vehicles that may be useful in facilitating vehicle driving. For example, the information may be useful for a particular vehicle in order to assist ACC driving for vehicles proximate to a merging vehicle.

In some embodiments, DSCR configured devices are intended to be used with one or more vehicle control systems. Examples of vehicle control systems include adaptive cruise control (ACC) systems, intelligent cruise control systems, autonomous driving systems, driver-assist systems, lane departure warning systems, freeway merging, exiting, and lane-change systems, collision warning systems, integrated vehicle-based safety systems, automatic guided vehicle systems, etc. Some of the embodiments are disclosed below in the context of an ACC system.

Figure 2:
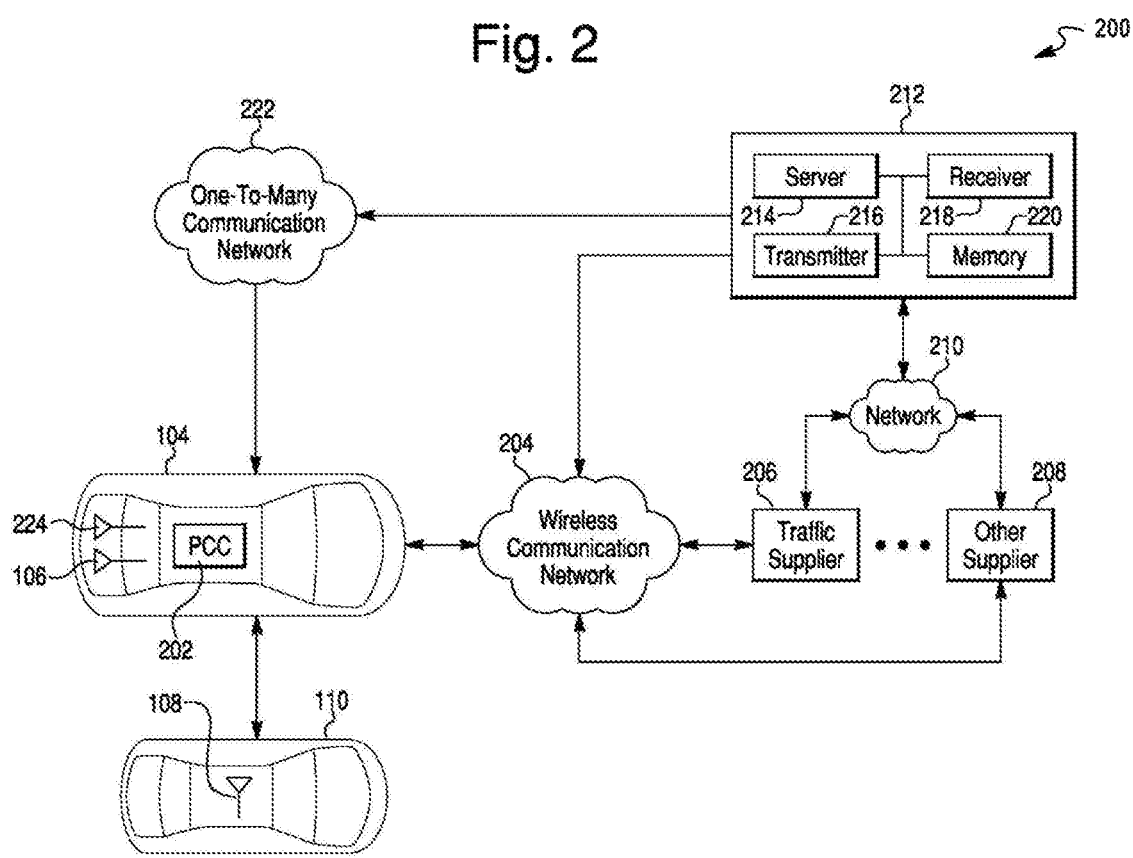
FIG. 2 is a schematic of a vehicle communication network according to aspects of the embodiments.

FIG. 2 is a schematic of a vehicle communication network 200 according to some the embodiments. Host vehicle 104 includes an ACC system 202 that can receive and assess traffic information and data. Components of ACC system 202 can exchange vehicle and traffic data messages, alerts, vehicle locations, and/or other useful information with other DSRC compatible vehicles via V2V transceiver 106.

ACC system 202 may transmit and receive information directly or indirectly to and from a service provider 212 over a wireless communication network 204. In an embodiment, the service provider 212 includes a remote server 214, a remote transmitter 216, a remote receiver 218, and a remote memory 220 that are configured to be in communication with one another. In one embodiment, host vehicle 104 can receive data and information from the service provider 212 by way of a one-to-many communication network 222. The one-to-many communication network 222 can include systems that can send information from one source to a plurality of receivers. Examples of one-to-many communication networks can include television, radio, satellite networks, etc.

In FIG. 2, V2V transmitter 106 can be used by the ACC system 202 to receive and transmit information to and from the service provider 212 and other information providers through wireless communication network 204 and a broadband network 210, such as the Internet. In alternative embodiments, a radio frequency (RF) transceiver 224 in host vehicle 104 can be used by the ACC system 202 to receive and transmit information to and from the service provider 212 through wireless network antenna 134 to wireless communication network 204. The RF transmitter 224 can include, but is not limited to, a wireless phone, a wireless modem, a Wi-Fi compatible transceiver, and/or any other device that communicates with other networks using a wireless communication network 204. Host vehicle 104 can also receive and transmit information to and from a traffic data supplier 206 and/or one or more other information suppliers 208. This information can include, but is not limited to, traffic data, vehicle location and heading data, high-traffic event schedules, weather data, or other transport related data, etc. Traffic data supplier 206 and other information supplier 208 can communicate with service provider 212 through broadband network 210.

In an embodiment, service provider 212 may be linked to multiple vehicles through a network connection, such as via the wireless network antenna 134 (see FIG. 1), and/or other network connections. Further, any other wireless communication system capable of delivering data may be used such as satellite, cellular, Wi-Fi, microwave, etc. Service provider 212 may also be linked by a wired connection, such as broadband cable or fiber optic connections, Ethernet, DSL, ADSL, telephone modems, and/or any other wired communication system capable of delivering data to traffic infrastructure such as RSE 132.

II. Service Provider

Figure 3:
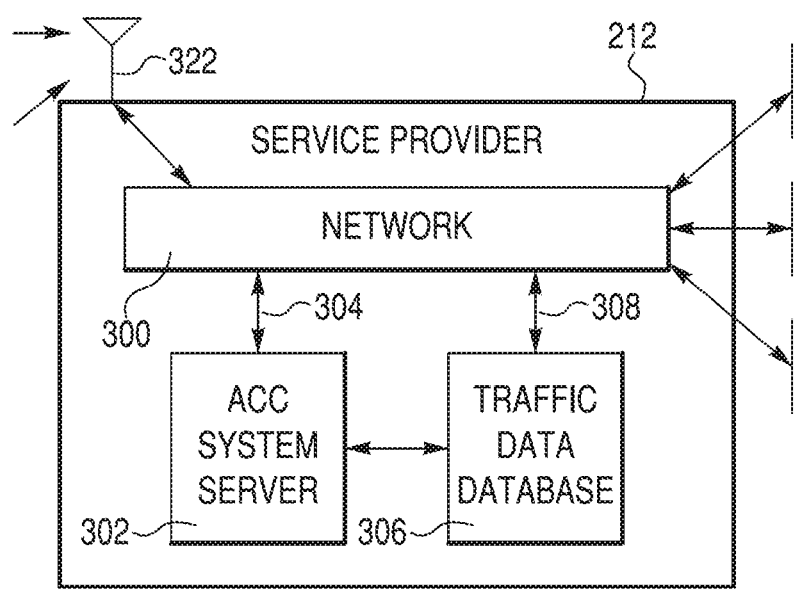
FIG. 3 is a schematic of an embodiment of a service provider of the vehicle communication network of FIG. 2.

FIG. 3 is a schematic of an embodiment of service provider 212 of the vehicle communication network 200. In FIG. 3, the service provider 212 may include a computer controlled service provider network 300, an ACC system server 302, and a traffic data database 306. ACC system server 302 and traffic data database 306 may communicate, through service provider network connections 304 and 308, respectively, to service provider network 300. Alternatively, this communication can be performed directly. The service provider network 300 can be capable of communicating with one or more internal and external computer or communication networks, computer systems, or controller systems, such as vehicle communication network 200. In some embodiments, traffic data database 306 is stored on ACC system server 302. However in other embodiments, traffic data database 306 may be partially or fully located remote from ACC system server 302. In some embodiments, ACC system server 302 may perform some or all of the functions of ACC system 202. In other embodiments, ACC system server 302 and ACC system 202 share functionality.

ACC system server 302 and traffic data database 306 can include processors, memory, and instructions to operate as a computer. ACC system server 302 may interact with traffic data database 306 to access traffic data and/or information, such as graphics, maps, images, videos, navigational data, or any other data that can be useful to ACC system 202. Traffic data database 306 may be organized using any known, related art and/or later developed data storage method and/or structure. Traffic data database 306 may also include hard drives, flash drives, magnetic drives with removable storage media, such as disks or tape, or optical drives with removable storage media, such as discs, memory sticks, memory cards, embedded or discrete flash memory, and/or any other type of memory.

Traffic data may be transmitted to service provider 212 either wirelessly or through wired connections in any manner known or presently unknown the art, such as via transceiver 322 shown in FIG. 3. Traffic merge data may be received wirelessly via first, second, and third data providers 310, 312, 314, which can be other vehicles in vehicle communication network 200 transmitting traffic data. For example, host vehicle 104, remote vehicle 110, and first traffic vehicle 114, second traffic vehicle 118, and third traffic vehicle 122 can transmit real time traffic data from V2V communication systems over vehicle communication network 200 that can be received and processed by ACC server 302. The embodiments are intended to also include traffic data provided via first, second, and third data providers 310, 312, 314, which may include data from commercial information providers, traffic data providers, web cams, or government agencies (such as a state or federal departments of transportation). The first, second, and third data providers 310, 312, 314 can provide location and traffic information to service provider 212, such as traffic at specific locations, school locations and schedules, bicycle zones, construction projects, temporary roadway or lane closings, train locations and schedules that may interfere with roadway traffic, weather updates, major events causing unusual traffic patterns such as concerts and athletic competitions, and/or navigation map feature updates.

III. Adaptive Cruise Control System

Figure 4:
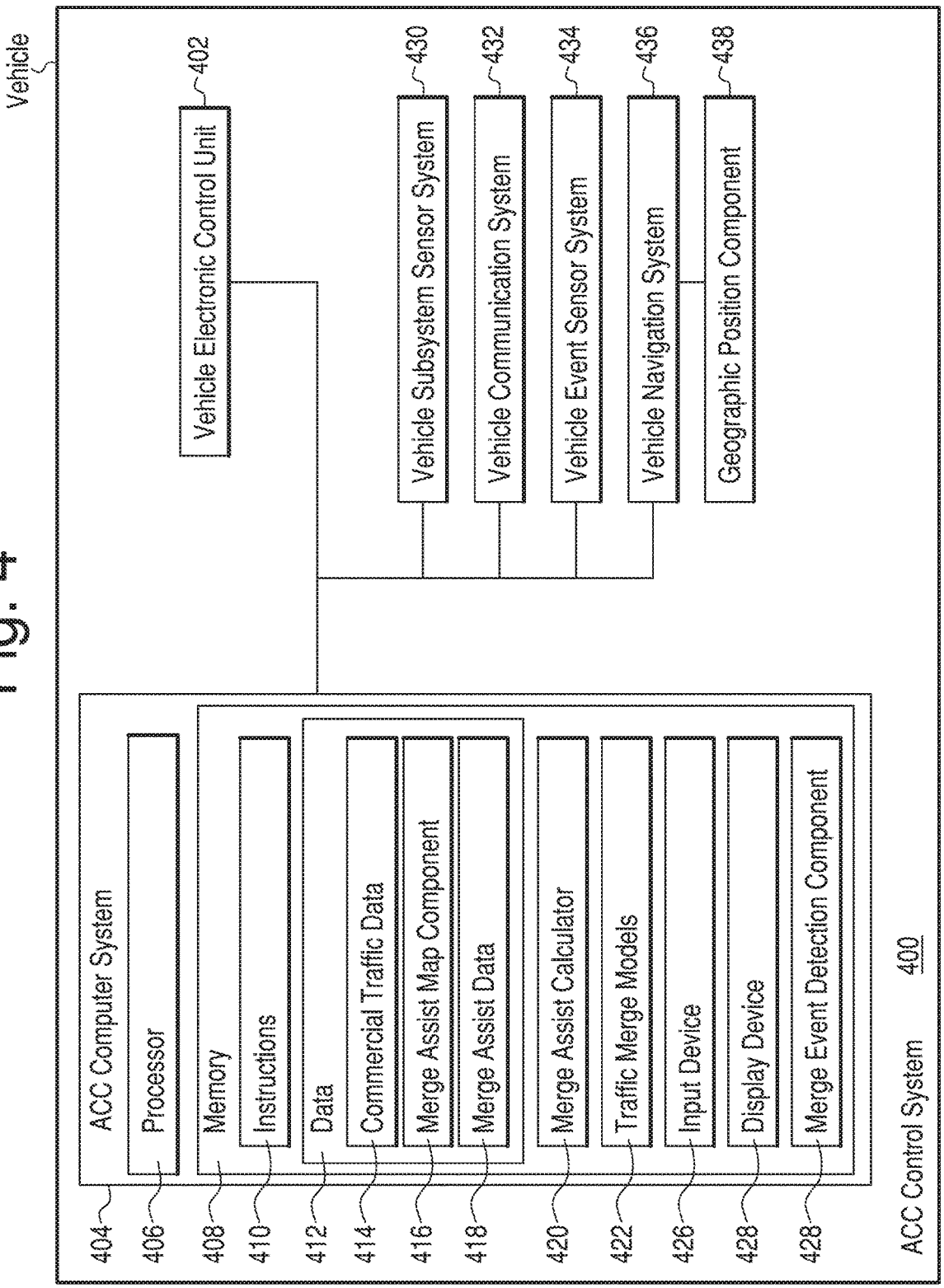
FIG. 4 is a schematic of an adaptive cruise control (ACC) system that can be used with the vehicle communications network shown in FIG. 2.

FIG. 4 is a schematic of the ACC system 202 of the host vehicle 104 of FIG. 2. However, the disclosed ACC system 202 may be associated with other vehicles or used in other applications. Other ACC systems associated with some vehicles may include different elements and/or arrangements as configured to ACC system 202, but may be configured to communicate over vehicle communication network 200 with one or more other ACC systems. The ACC system shown in FIG. 4 is designated with reference number 400 to clearly express the intention to also or alternatively use the system by other entities or in other applications.

The host vehicle 104 may have one or more computers, such as an ACC computer system 404 (computer system) including a processor 406, a memory 408 and other components typically present in general or special purpose computers. In some embodiments, the ACC system 400 may include programmable logic circuits and/or pre-configured logic circuits for executing ACC system functions. The memory 408 stores information accessible by processor 406 including instructions 410 and data 412 that may be executed or otherwise used by the processor 406. The control logic (in this example, software instructions or computer program code), when executed by the processor 406, causes processor 406 to perform the functions of the embodiments as described herein. The memory 408 may be of any type capable of storing information accessible by the processor, including a computer-readable medium, or other medium that stores data that may be read with the aid of an electronic device, such as a hard-drive, flash drive, memory card, ROM, RAM, DVD or other optical disks, as well as other write-capable and read-only memories. Systems and methods may include different combinations of the foregoing, whereby different portions of the instructions and data are stored on different types of media.

The instructions 410 may be any set of instructions to be executed directly (such as machine code) or indirectly (such as scripts) by the processor 406. For example, the instructions may be stored as computer code on the computer-readable medium. In this regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

Data 412 may be retrieved, stored or modified by the processor 406 in accordance with the instructions 410. For instance, although the system is not limited by any particular data structure, the data may be stored in computer registers, in a relational database as a table having a plurality of different fields and records, XML documents or flat files. The data may also be formatted in any computer-readable format. The data may include any information sufficient to identify the relevant information, such as numbers, descriptive text, proprietary codes, references to data stored in other areas of the same memory or different memories (including other network locations) or information that is used by a function to calculate the relevant data.

The processor 406 may be any known, related art or later developed processor. Alternatively, the processor may be a dedicated device, such as an ASIC (application-specific integrated circuit) or DSP (digital signal processor). Although FIG. 4 illustrates the processor 406, memory 408, and other elements of computer system 404 as being within the same block, it will be understood by those of ordinary skill in the art that the processor 406 and memory 408 may actually include multiple processors and memories that may or may not be stored within the same physical housing. For example, memory 408 may be a hard drive or other storage media located in a housing that is different from that of computer system 404. Accordingly, references to a processor or computer will be understood to include references to a collection of processors, computers or memories that may or may not operate in parallel. Rather than using a single processor to perform the steps described herein, some of the components, such as steering components and deceleration components, may each have their own processor that only performs calculations related to the component's specific function.

In an alternative embodiment, the processor 406 may be located remote from the host vehicle 104 and communicate with the vehicle wirelessly. In the embodiments, some of the processes described herein are executed on a processor disposed within the host vehicle 104, and others by a remote processor such as a processor in ACC system server 302.

Computer system 404 may include all of the components normally used in connection with a computer, such as a central processing unit (CPU) (e.g. processor 406), the memory 408 (e.g., RAM and internal hard drives) storing data 412 and instructions 410, such as a web browser, a communicator/annunciator such as a display device 426 (e.g., a monitor having a screen, a small LCD touch-screen or any other electrical device that is operable to display and/or audibly playout information), and a user input device 424 (e.g., a mouse, keyboard, touch screen and/or microphone). The computer system 404 can also include components not normally associated with general purpose computers, such as merge event detection component 428 and a merge event calculator 420.

The computer system 404 may be capable of communicating with various components of the host vehicle 104. For example, computer system 404 may be in communication with the vehicle's electronic control unit (ECU) 402 and may send and receive information from the various systems of host vehicle 104, for example a vehicle subsystem sensor system 430, a vehicle communication system 432, a vehicle event sensor system 434, and a vehicle navigation system 436. ECU 402 may be configured to communicate with, and/or control, various components of host vehicle 104. When engaged, computer system 404 may control some or all of these functions of host vehicle 104. It will be understood that, although various systems and computer system 404 are shown within host vehicle 104, these elements may be external to host vehicle 104 and/or physically separated by large distances.

As indicated above, the host vehicle 104 may also include the vehicle subsystem sensor system 430. The computer system 404 may communicate with sensors in one or more vehicle subsystems to gather data for host vehicle 104 speed, direction, acceleration, braking, and/or other factors. The vehicle subsystem sensor system 430 may include, but is not limited to, engine oil/coolant sensing systems, transmission oil sensing systems, brake sensing systems, steering and control sensing systems, fuel storage sensing systems, torque sensors, and speed and acceleration/deceleration sensors, inertia (yaw) sensor systems, etc.

As indicated above, the host vehicle 104 may also include the vehicle communication system 432. The computer system 404 may communicate with external communication apparatus for sending and receiving traffic data. For instance, the vehicle communication system 432 includes vehicle V2V transceiver 106 that can communicate with compatible DSRC transceivers in the vehicle communication network 200. As described previously in relation to FIG. 2, the vehicle communication system 432 can include the RF transceiver 224 for communicating wirelessly to service provider 212 through wireless communication network 204.

As further indicated above, the host vehicle 104 may also include the vehicle event sensor system 434 for collecting traffic data. Traffic data can include detecting the location, orientation, heading, etc., of entities external to the host vehicle 104, such as other vehicles, bicycles, and motorcycles, pedestrians, obstacles in the roadway 102, traffic signals, signs, wildlife, trees, or any entity that can provide information to ACC system 400. The traffic data can include any transport related data, such as one or more vehicles, vehicle kinematics, roadways and/or paths, navigation, infrastructure, environmental scenarios, weather conditions, roadway conditions, terrain, and/or vehicles merging from one path into a second path.

The vehicle event sensor system 434 may collect sensor data from sensor apparatus including radar, lidar, sonar, cameras, DSRC transceivers or any other detection devices which can transmit traffic data that can be processed by the computer system 404. Vehicle sensor systems and DSRC communication systems can provide data that is processed by the computer system 404 in real-time. In other words, the sensors may continuously update their output to reflect the traffic 130 and merging remote vehicle 110 being sensed at or over a range of time, and continuously or as-demanded to provide updated output to the computer system 404. A merge assist calculator 420 can perform statistical and predictive calculations to determine two or more vehicle's current position data, course heading data, course history data, projected course data, kinematic data, range or distance data, speed and acceleration data, and/or proximate traffic location data. Further, traffic data can include any static or dynamic data and information that are provided in prepared traffic merge models 422 that could be relevant to the functions of the computer system 404.

Data for a traffic merge can be classified as location based, time based, scenario based, hazard or risk based, or another classification or a combination of classifications. Traffic data from various sources within and external to host vehicle 104 can be saved in merge assist data 418.

As shown in FIG. 4, the memory 408 component for data 412 may include components for commercial traffic data 414, a merge assist map component 416, a merge event detection component 428, the traffic merge models 422 and the merge assist data 418.

If desired, more detailed roadway maps and information can be generated and saved by the merge assist map component 416 for use by the host vehicle 104 or other vehicles confronted with merging vehicles at the same location. Merge event map information can include maps identifying the shape and elevation of roadways, lane lines, intersections, crosswalks, bicycle lanes, school zones, speed limits, traffic signals, buildings, signs, real time traffic information, or other transport information that can be used by vehicles. For example, the map information may include one or more mapped networks of information, such as roadways, lanes, intersections, and the connections between these features. Each feature may be stored as map data, and may be associated with information, such as a geographic location, and whether or not it is linked to other related features, e.g., dimensions of a widened merge lane may be linked to a roadway location and an entrance ramp, etc. Data 412 may also include commercial traffic data 414, which can include commercially-available databases of transport data, traffic data, traffic schedules, and any other data that could be useful for the embodiments.

The merge event detection component 428 can include processes and instructions 410 for detecting merging vehicle data and information. The merge event detection component 428 can include detection of V2V signals from a vehicle intending to merge into traffic and V2V signals of the traffic vehicles.

The vehicle navigation system 436 can be interoperable with computer system 404 to provide navigation maps and information to host vehicle 104. Vehicle navigation system 436 may be any type of known, related or later developed navigational system. The phrase "navigation information" refers to any information that can be used to assist host vehicle 104 in navigating a roadway or path. Navigation information may include traffic data, map data, and roadway classification information data. Examples of navigation information can include street addresses, street names, street or address numbers, intersection information, points of interest, parks, bodies of water, any political or geographical subdivision including town, township, province, prefecture, city, state, district, ZIP or postal code, and country. Navigation information can also include commercial information including business and restaurant names, commercial districts, shopping centers, and parking facilities. Navigation information can also include geographical information, including information obtained from any Global Navigational Satellite infrastructure (GNSS), including Global Positioning System or Satellite (GPS), Glonass (Russian) and/or Galileo (European).

The host vehicle 104 may also include a geographic position component 438 as part of vehicle navigation system 436 that may include a GPS receiver 510 (see FIG. 5) to determine the host vehicle's latitude, longitude and/or altitude position. Other location systems, such as laser-based localization systems, inertial-aided GPS, or camera-based localization may also be used to identify an absolute or relative host vehicle 104 location. The GPS receiver 510 may be used for gathering additional information associated with host vehicle 104 that includes, but is not limited to, speed, location, trajectory, distance traveled, acceleration, and other dynamic vehicle information. In alternative embodiments, the host vehicle 104 may also include other features in communication with the computer system 404, such as an accelerometer, a gyroscope, or another direction/speed detection device to determine the direction and speed of the vehicle or changes thereto.

Host vehicle 104 may include other apparatus for communicating, and in some cases controlling, the various components associated with vehicle subsystems.

IV. Vehicle Systems Associated with the ACC System

Figure 5:
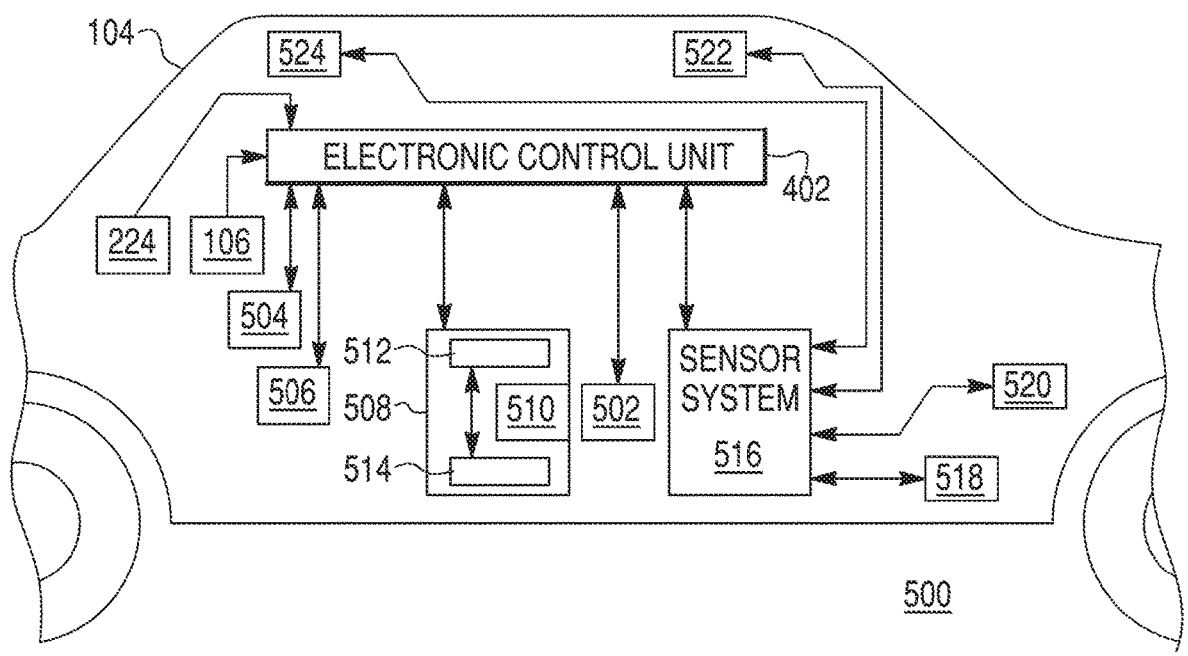
FIG. 5 is a schematic of vehicle systems that can be associated with the adaptive cruise control system of FIG. 4.

FIG. 5 is a schematic showing vehicle systems 500 that can be associated with the ACC system 400 of FIG. 4. As shown in FIG. 5, ECU 402 can communicate with a data logger system 502, the vehicle subsystem 504, an ACC controller 506, a navigation system 508, a vehicle sensor system 516, the vehicle V2V transceiver 106, RF transceiver 224, a camera 522, and a laser 524.

In the embodiments, data logger system 502 may communicate with ECU 402 to acquire and log data collected from any of the vehicle systems and subsystems. Data relevant to ACC system 400 includes, but is not limited to, navigation data, sensor data, radar data, multimedia data, such as images or video streams, audio information, scanner data, etc.

In some embodiments, ECU 402 may be configured to receive instructions from the computer system 404 for commands to the ACC controller 506, for example, to activate or suppress a brake or accelerator, etc.

Host vehicle 104 can include the navigation system 508 that is configured to be in communication with ECU 402 and perform the functions of vehicle navigation system 436. Navigation system 508 may include a navigation system display 512, and can store map and location information in a navigation database 514. Navigation system display 512 may display navigational maps and information to a user using any type of display technology known or presently unknown in the art. Navigation system display 512 may also communicate information to host vehicle 104 using any type of known, related art or later developed audio technology, such as by using predetermined sounds or electronically generated speech.

In an embodiment, the sensor system 516 can communicate with ECU 402 and any number of vehicle sensor devices in any configuration, such as sensor 518, radar system 520, camera 522, and laser 524, disposed at any beneficial area of host vehicle 104. Sensor system 516 may communicate with multiple devices that assist in collecting data including, but not limited to, sensors 518 that can collect data for vehicle speed, steering, and inertia (yaw) relative to gravity or a perpendicular plane to gravity. Although one sensor 518 is shown in FIG. 5, it is understood that sensor 518 is a representation of one or more sensors installed within or outside of host vehicle 104. Other embodiments of sensors 518 can collect proximity data using rear, front, and side proximity detection sensors 518. The sensor system 516 devices can be advantageous by collecting data for identification and tracking the movement of traffic entities such as motorcycle and vehicular traffic, or any other condition, entity, or vehicle that could provide data.

FIG. 5 also shows the V2V transceiver 106 of host vehicle 104 for communicating with other V2V compatible vehicles. In an embodiment, V2V transceiver 106 can collect traffic data from other DSRC transceivers that can be configured for a vehicle, pedestrian, bicycle, building, tower, billboard, traffic signal, roadway sign, or any transport related entity or user. A display operationally connected to a DSRC transceiver can also display any messages, maps, vehicle locations, data, images, alerts, and warnings transmitted to or received from DSRC users in vehicle communication network 200. A communications link between DSRC transceivers may be initiated by any user. In the embodiments, a DSRC transceiver may continuously search for signals from other DSRC transceivers, such as by emitting a periodic signal that searches for a reply. In other embodiments, a DSRC transceiver may emit periodic signals searching for a reply from an in-range DSRC transceiver. If a DSRC transceiver replies, then a communications link may be established. Information and data received by V2V transceiver 106 can be saved to data logger system 502 and/or merge assist data 418 and processed by computer system 404.

V. Vehicle Interior

Figure 6:
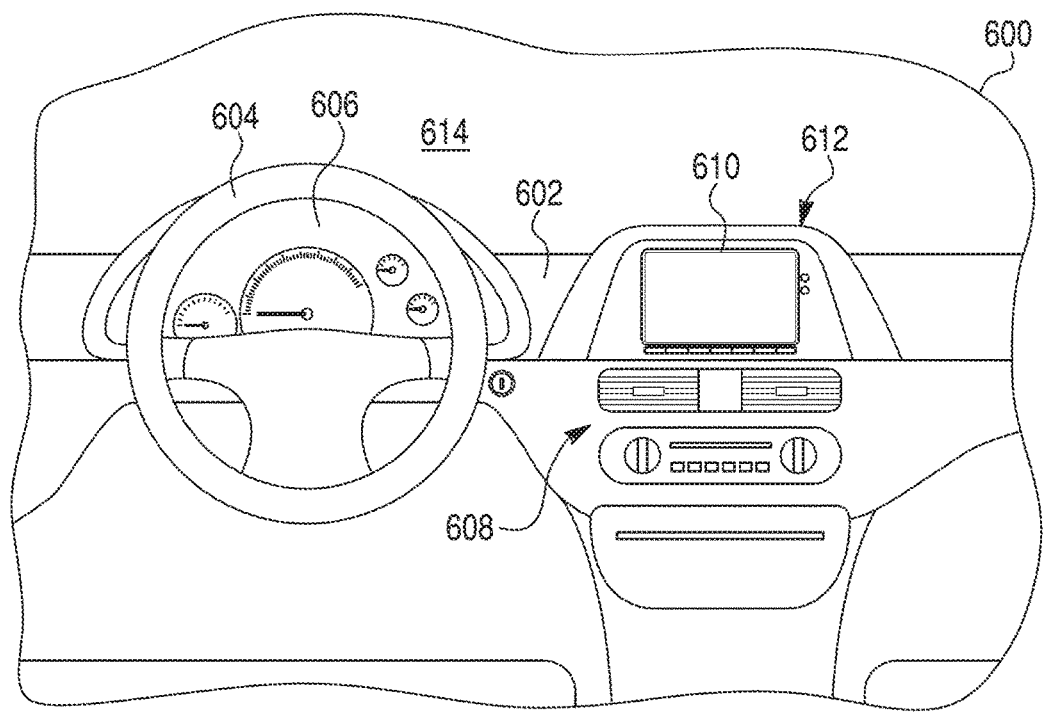
FIG. 6 is a schematic of an exemplary design of a vehicle interior associated with the adaptive cruise control system of FIG. 4.

FIG. 6 is a schematic of an exemplary design of a vehicle interior 600 associated with the ACC system 400 of FIG. 4. The vehicle interior 600 may include, for example, a dashboard 602, a steering apparatus such as a steering wheel 604, an instrument panel 606, and a center portion 608. Center portion 608 can include one or more devices associated with the interior of the vehicle, including but are not limited to: audio devices, video devices, navigation devices, as well as any other types of devices. In addition, center portion 608 can be associated with controls for one or more systems of host vehicle 104 including, but not limited to: climate control systems, radio and sound systems, and other types of systems. The host vehicle 104 may also have a display device 610 for displaying information from ACC system 400, and/or other related or unrelated vehicular systems. In some embodiments, host vehicle 104 can include a driver vehicle interface 612 that may include the display device 610. Examples of display device 610 include, but are not limited to, LCDs, CRTs, ELDs, LEDs, OLEDs, or electronic paper displays each with or without a touchscreen, as well as other types of displays. Display device 610 can include a touchscreen for use as the user input device 424 for activating or deactivating one or ACC system modes, and for enabling a user to provide information, such as navigation destination or traffic information, to the computer system 404.

In alternative embodiments, driver vehicle interface 612 can include buttons, a keypad, or other types of input devices 424. In another embodiment, driver vehicle interface 612 can include a heads up projection type display that is configured to project an image onto one or more surfaces of host vehicle 104, such as windshield 614. In some embodiments, display device 610 can be located in any portion of host vehicle 104, or can be a portable device. For example, display device 610 can be located within instrument panel 606.

In addition, while display device 610 can be configured to present visual information for computer system 404, display device 610 can be shared with other devices or systems within host vehicle 104 such as vehicle navigation system 436. In an example, display device 610 may display traffic information, alerts, driving information, and navigation maps to a vehicle operator.

A driver vehicle interface may inform a driver with visual or auditory alerts or information of a predicted traffic merge by another vehicle. For example, display device 610 can be configured to display merge alerts and traffic data related to merging remote vehicle 110 and proximate traffic 130 when the remote vehicle 110 is heading in a trajectory that would affect the operation of host vehicle 104.

VI. Methods of Operation

FIG. 1 shows an overhead view of the traffic scenario 100. The vehicles, locations, and other data related to traffic scenarios at roadway 102 can be the subject of digital navigation maps generated by the merge assist map component 416 for integration with the digital vehicle navigation system 436 for display on display device 426. The roadway 102 is merely provided as an exemplary roadway or path in order to illustrate embodiments of ACC system 400 and is not intended to be limiting.

Exemplary aspects of roadway 102 include three lanes of a divided highway with an entrance ramp 108 that allows vehicles to merge into the roadway 102. The embodiments, however, are not limited by a specific entrance ramp or merge lane and are intended to include any type of vehicular merging activity where a vehicle enters into a path or proximate to a path of one or more moving vehicles.

ACC system 400 can be configured to collect real time traffic data at or near roadway 102 from multiple sources in host vehicle 104 using DSRC communication, for example V2V signals from other vehicles, vehicle event sensor system 434, navigation system 508, and/or user input on input device 424 into merge assist data 418. Alternatively, ACC system 400 can upload merge assist data 418 from host vehicle 104 to service provider traffic data database 306 for use by other vehicles by accessing the data through vehicle communication network 200.

To accommodate a vehicle merging into congested traffic, each ACC system 400 can be configured to detect likely driving maneuvers and react with host vehicle 104 controls that minimize negative driving effects of congested traffic and/or a merging vehicle. In an embodiment, the merge assist calculator 420 may be utilized by computer system 404 to analyze or calculate real-time location, speed, acceleration/deceleration, and heading of remote vehicle 110 using data received via DSRC V2V communications and/or vehicle event sensor system 434. The merge assist calculator 420 can determine the relative speed of the merging remote vehicle 110 as compared to the speed of the traffic 130 and host vehicle 104. The merge assist calculator 420 can also generate a prediction as to whether the merging remote vehicle 110 will affect the speed of traffic 130, or whether traffic 130 will affect the speed of remote vehicle 110. Based on the prediction analysis, ACC system 400 can be configured to control host vehicle 104 systems via the ACC controller 506 for responding to any slowdown of vehicles in the immediate path of the host vehicle 104.

In an embodiment, merge assist calculator 420 may use one or more equations that are derived using Bayes' Theorem or Bayesian Rule to perform calculations and generate traffic predictions. Generally, Bayes' Theorem relates the conditional and marginal probabilities of various random events. Using a Bayesian Rule, probabilities of different events occurring may be determined given certain observed scenarios. As a result, the probability of an event occurring generally increases as more prior information from observed scenarios is provided. The merge assist calculator 420 may use a Bayesian Rule to combine the various probabilities determined based on conditions associated with any of the data 412 for traffic behaviors and a vehicle merging into the traffic.

While some of the embodiments are based on an application of Bayes' Theorem, other embodiments are intended to include or otherwise cover other calculation methods by the merge event calculator 420. The merge event calculator 420 may utilize empirical assumptions, fuzzy logic, neural network applications, analysis of variance (ANOVA), discriminant analysis, or any other appropriate analytical and/or statistical methods to perform data analysis.

Alternatively or simultaneously, with a deceleration and/or braking of host vehicle, the ACC system 400 may generate information, suggestions, warnings, and/or alerts and provide the same to a vehicle operator on display device 426. The information, warnings, etc., can include, but are not limited to, one or more navigation maps, symbols, icons, graphics, colors, images, photographs, videos, text, audible information, etc.

Figure 7:
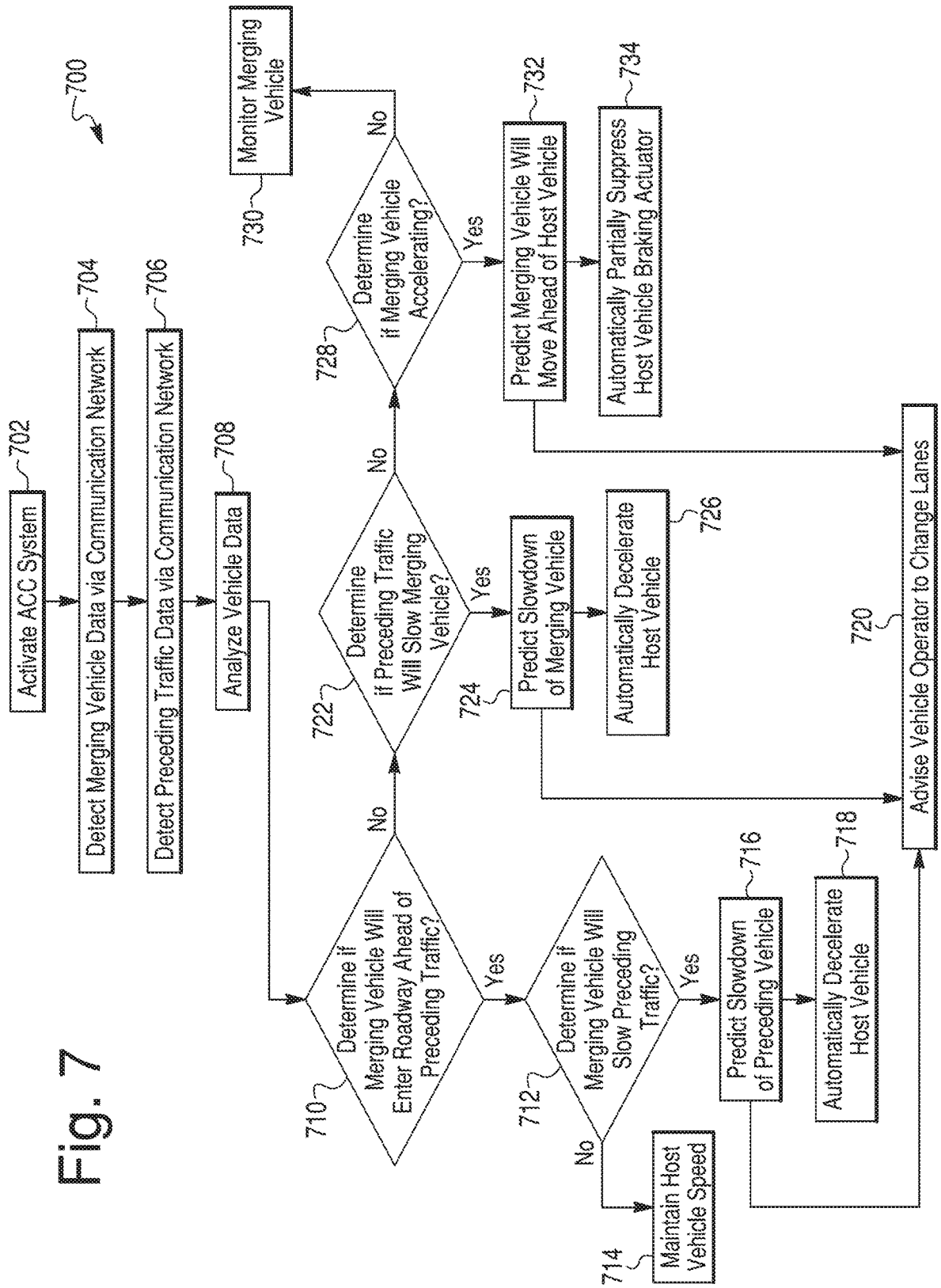
FIG. 7 is a flowchart of an exemplary method to control a subject vehicle with the adaptive cruise control (ACC) system of FIG. 4.

FIG. 7 is a flowchart of an exemplary method 700 to control host vehicle 104 before and during the entire process of remote vehicle 110 merging into roadway 102. The exemplary method 700 can be implemented partially or entirely using the embodiments for devices and systems described in FIGS. 1 through FIG. 6. The devices, systems, and methods of the embodiments can be applied to driving conditions illustrated in a first traffic scenario in FIG. 8, a second traffic scenario illustrated in FIG. 9, and a third traffic scenario in FIG. 10. However, the devices, systems, and methods of the embodiments may be applied to other embodiments, vehicles, driving conditions, traffic scenarios, etc.

The method 700 may include block 702 to activate the ACC system 400 in host vehicle 104 either automatically based on a preset trigger or manually by a user, vehicle operator, etc. Activating the ACC system 400 can include activating DSRV V2V transceiver 106. In block 704 the ACC system 400 may detect, using merge event detection component 428, the remote vehicle 110 traveling on entrance ramp 108. Detection methods can include vehicle communication system 432 receiving V2V messages from remote vehicle 110 that contain data indicating location, acceleration in speed, and a heading towards roadway 102. Calculations of a predicted path of travel of remote vehicle 110 can be made by merge assist calculator 420 using Bayesian statistics or any known method.

The method 700 may further include block 706 to detect, using the merge event detection component 428, the location and speed of vehicles in traffic 130 on roadway 102. Detection of each traffic vehicle's speed, location, and movement can be determined by analyzing data in DSRC V2V messages received from first, second and third traffic vehicles 114, 118, and 122. Alternatively, vehicular traffic 130 data in DSRC messages could be received by RSE 132, and the messages re-broadcast in V2I messages that can be received and analyzed by the ACC system 400. An RSE re-broadcast of traffic 130 data could be beneficial if host vehicle 104 was out of range to detect DSRC signals of one or more traffic 130 vehicles, such as vehicles at or near the front of traffic congestion (e.g., traffic vehicle 114). Speed, location, and other vehicular data for the fourth traffic vehicle 126 and the fifth traffic vehicle 126 may be collected, if possible, using line-of-sight sensors such as the radar system 520, the camera 522, or other sensors controlled by vehicle event sensor system 434.

The method 700 may further include block 708 to analyze vehicular data by computer system 404 that includes, but is not limited to, the speed, acceleration, location, heading, etc., of remote vehicle 110 and traffic 130. The merge assist calculator 420 can analyze the remote vehicle's 110 speed and geographic location data and compare to the speed and geographic location data of vehicles in traffic 130.

Figure 8:
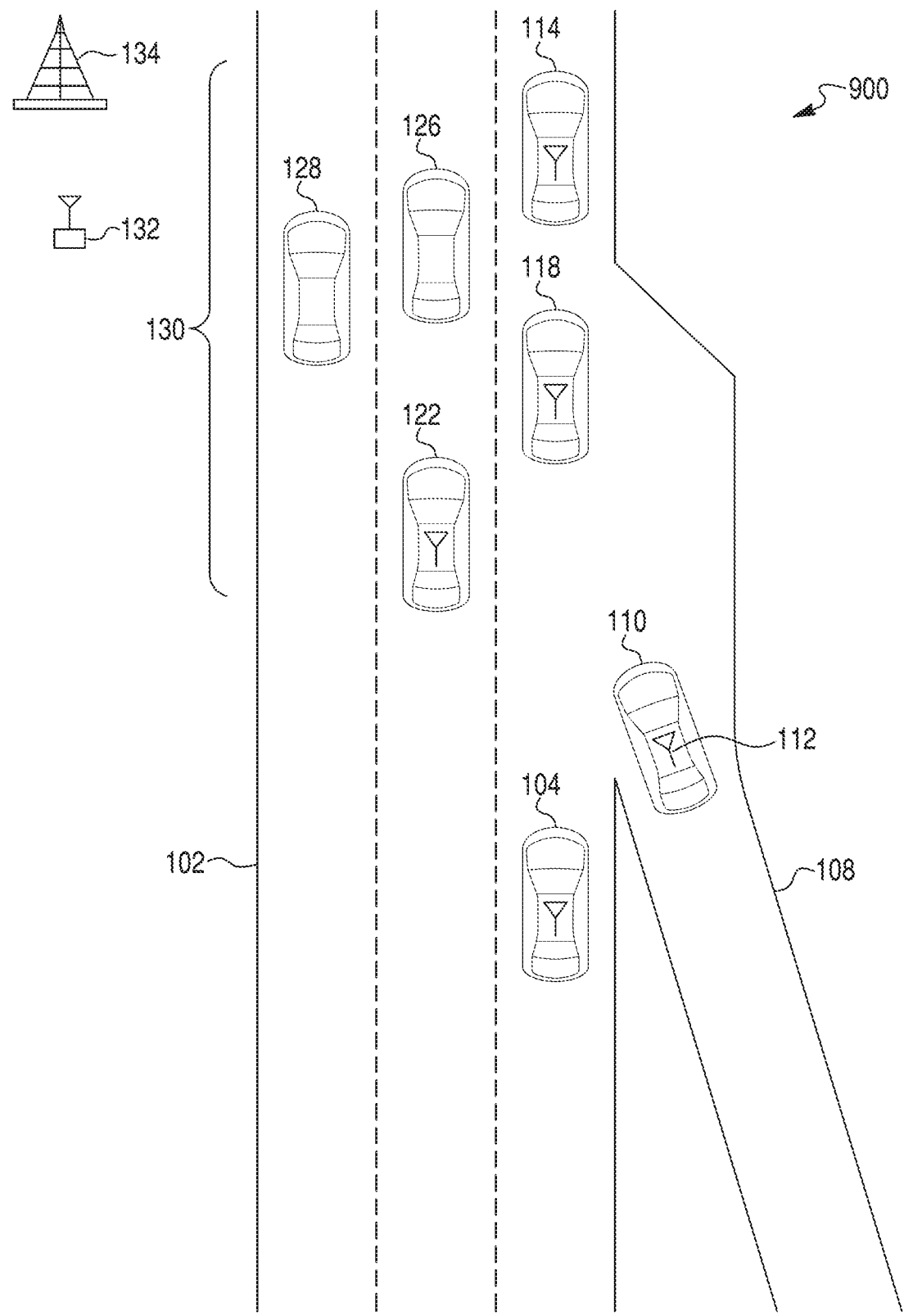
FIG. 8 is a schematic of a first traffic scenario for illustrating aspects of the adaptive cruise control system of FIG. 4 as a remote vehicle merges ahead of traffic congestion.

FIG. 8 is a first traffic scenario 800 using the transportation infrastructure of FIG. 1 and the vehicle communication network of FIG. 2 to illustrate the embodiments. The host vehicle 104 can receive DSRC V2V signals from remote vehicle 110, first traffic vehicle 114, second traffic vehicle 118, and third traffic vehicle 122. The exemplary method can use traffic merge models 422 to calculate a likelihood of whether fourth traffic vehicle and/or 126 fifth traffic vehicle 128 will accelerate or decelerate according to the behavior of the DSRC equipped vehicles. Radar system 520 and/or camera 522 can be used to track the actual traffic vehicle movements, when possible.

In the first traffic scenario 800, roadway 102 is congested with traffic 130. Remote vehicle 110 travels along a path of entrance ramp 108 intending to merge into roadway 102. A merge by remote vehicle 110 in front of traffic 130 can cause the traffic vehicles to brake and slow down as the remote vehicle 110 progresses through the merge procedure. For example, if the remote vehicle 110 enters roadway 102 ahead of traffic vehicle 114, and the relative speed of the remote vehicle 110 is slower than the traffic vehicle 114, then traffic vehicle 114 will be forced to brake and slow down. Other traffic vehicles behind and adjacent to traffic 114 will likely brake and slow down as well. Alternatively, traffic vehicle 114 may apply brakes to allow remote vehicle 110 to merge ahead of traffic 130. In either example, the operator of host vehicle 104 may not be able to visually detect the actions of traffic vehicle 114, which is at the head of traffic 130, due to distance and/or intervening traffic vehicle 118 obscuring the view. Sudden braking by traffic vehicle 114, which is the lead vehicle in the congestion, may also cause some or all vehicles in traffic 130 to apply brakes and quickly slow down in a chain reaction effect. Traffic vehicle 118, reacting to the traffic vehicle 114, may be forced to perform a hard braking action to avoid a collision with traffic vehicle 114. Likewise, host vehicle 104, approaching traffic vehicle 118 from behind, may be forced to perform an unexpected hard braking action or perform an emergency lane change in order to avoid a collision with traffic vehicle 118.

To address these and other problems, the embodiments of ACC system 400 can generate a prediction as to whether the traffic 130 will slow down due to remote vehicle 110 merging ahead of traffic 130. The ACC system 400 can further determine to control an early automatic or assisted deceleration of host vehicle 104 before it encounters traffic 130.

For the first traffic scenario 800, the method 700 may also include block 710 where merge assist calculator 420 uses the real time vehicular data to determine whether remote vehicle 110 will enter roadway 102 ahead of preceding traffic 130. If host vehicle 110 will merge into roadway ahead of traffic 130, then in block 712 the merge assist calculator 420 determines whether remote vehicle 110 will slow the preceding traffic 130. The analysis may be performed by any known or currently unknown statistical method. In an embodiment, if a relative speed of merging remote vehicle 110 is slower than traffic 130, the merge assist calculator predicts in block 716 that the remote vehicle 110 merge will cause one or more traffic vehicles in traffic 130 to slow down. Using display device 426, the computer system 404 can alert or inform an operator of host vehicle 104 the anticipated traffic slow down.

In block 718, in the anticipation of slowing traffic 130, the computer system 404 instructs ACC System 400 to automatically decelerate the host vehicle 104. In an embodiment, the ACC system 400 can gradually reduce speed of host vehicle 104 by either controlling the vehicle's accelerator or by actuating the vehicle's brake system. The deceleration of host vehicle 104 prior to or during the merge of remote vehicle 110 can avoid a sudden, hard braking action or an emergency lane change by the operator of host vehicle 104 in order to avoid a collision with traffic vehicle 118. It can be advantageous to gradually decelerate host vehicle 104 to provide the vehicle operator a safer and more pleasant driving experience.

Alternatively or simultaneously, in block 720 the computer system 404 can generate an informing alert on display device 426 to advise host vehicle 104 to change the current lane or path to a lane or path that is less likely to be affected by traffic 130. The calculation for a lane change recommendation can be performed by the merge assist calculator 420 using any known method.

However, if the merge assist calculator 420 predicts that traffic 130 will not be affected by remote vehicle 110, then in block 714 the computer system 404 maintains current cruising speed of host vehicle 104.

Figure 9:
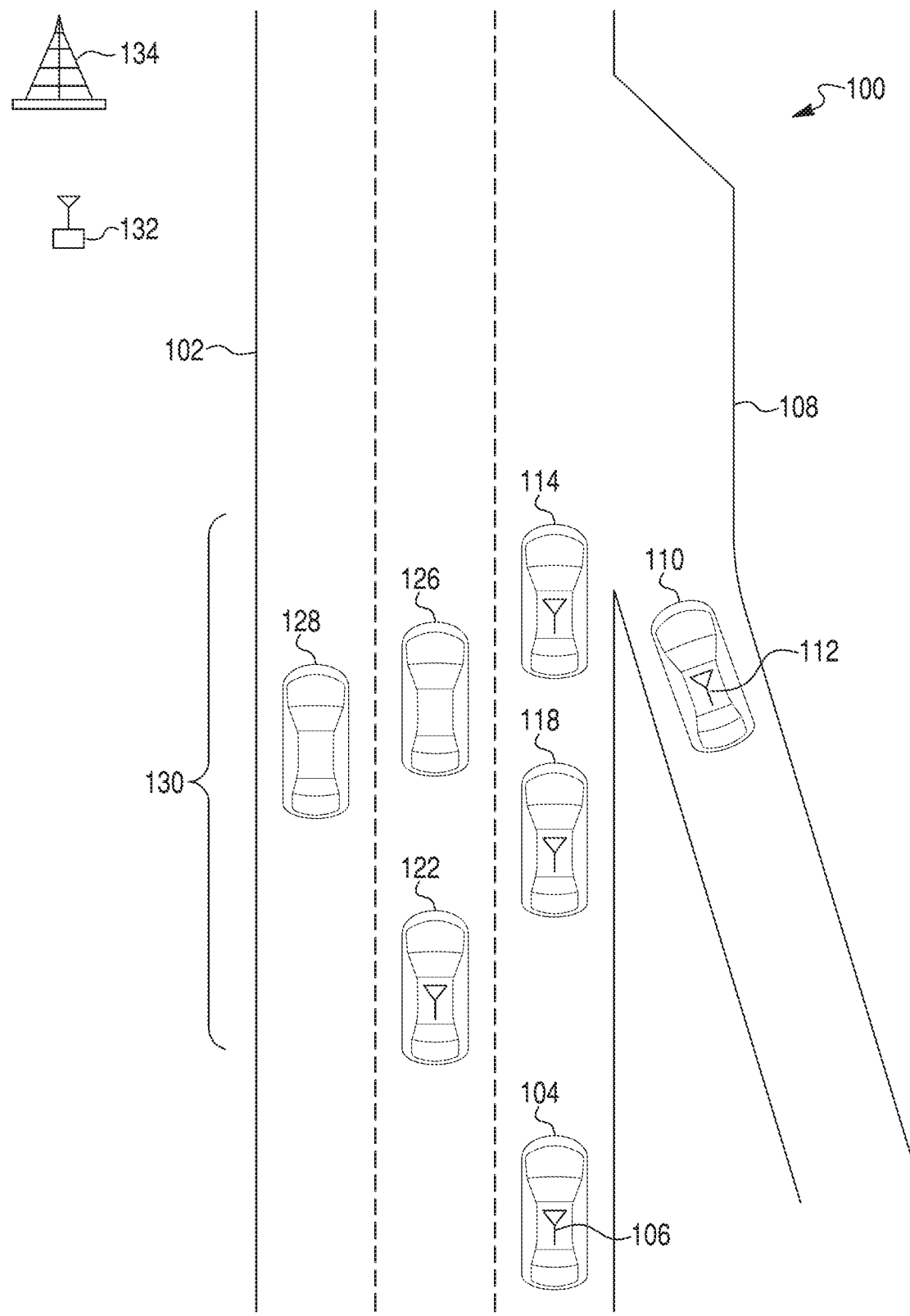
FIG. 9 is a schematic of a second traffic scenario for illustrating aspects of the adaptive cruise control system of FIG. 4 as a remote vehicle merges ahead of traffic congestion.

In block 710, if the merge assist calculator determines that the merging remote vehicle 110 will not enter roadway 102 ahead of preceding traffic, then the exemplary method proceeds to block 722 which is illustrated by the scenario of FIG. 9.

FIG. 9 is a second traffic scenario 900 to illustrate the embodiments using the transportation infrastructure of FIG. 1 and the vehicle communication network 200 of FIG. 2. In the second traffic scenario 900, remote vehicle 110 travels along a path on entrance ramp 108 intending to merge into roadway 102. As remote vehicle 110 enters roadway 102, congestion of traffic 130 may force remote vehicle 110 to brake and slow down during the merge. As it approaches the remote vehicle 110, the host vehicle 104 may be forced to perform a hard braking action or emergency lane change in order to avoid a collision. To address these and other problems, the embodiments of ACC system 400 can estimate congestion of preceding traffic 130 and anticipate a likelihood of whether the remote vehicle 110 will slow down due after entering roadway 102.

As remote vehicle 110 approaches the roadway 102, in block 722 the merge assist calculator 420 uses real time V2V data to estimate the speed of traffic 130 and determine whether the preceding traffic 130 will slow the acceleration of remote vehicle 110. Analysis of the traffic speeds can be performed by any known method. To collect data for the fourth traffic vehicle 126 and the fifth traffic vehicle 128 that are not configured with DSRC communications, computer system 404 can instruct ECU 402 to activate vehicle event sensor system 434 to collect radar data from radar system 520 for all traffic vehicles within range of detection. If the analysis results in a likelihood of remote vehicle 110 entering roadway 102 at a higher speed than traffic 130, the merge assist calculator 420 can generate a prediction to the ACC system 400 that remote vehicle 110 will quickly decelerate in front of host vehicle 104.

In block 726, the computer system 404 can respond by instructing the ACC System 400 to begin automatically decelerating the host vehicle 104. In an embodiment, the ACC system 400 can gradually reduce the speed of host vehicle 104 by controlling the vehicle's accelerator or alternatively by actuating the host vehicle's brake system. The deceleration of host vehicle 104 prior to or during the merge of remote vehicle 110 can avoid a sudden, hard braking action or an emergency lane change by the operator of host vehicle 104. It can also be advantageous to gradually decelerate host vehicle 104 to provide the vehicle operator a safer and more pleasant driving experience.

Alternatively or simultaneously, in block 720 the computer system 404 can generate an informing alert on display device 426 to advise the operator of host vehicle 104 to change the current lane or path to a lane or path that is less likely to be affected by remote vehicle 110. The calculation for a lane change recommendation can be performed by merge assist calculator 420 using any known method.

Figure 10:
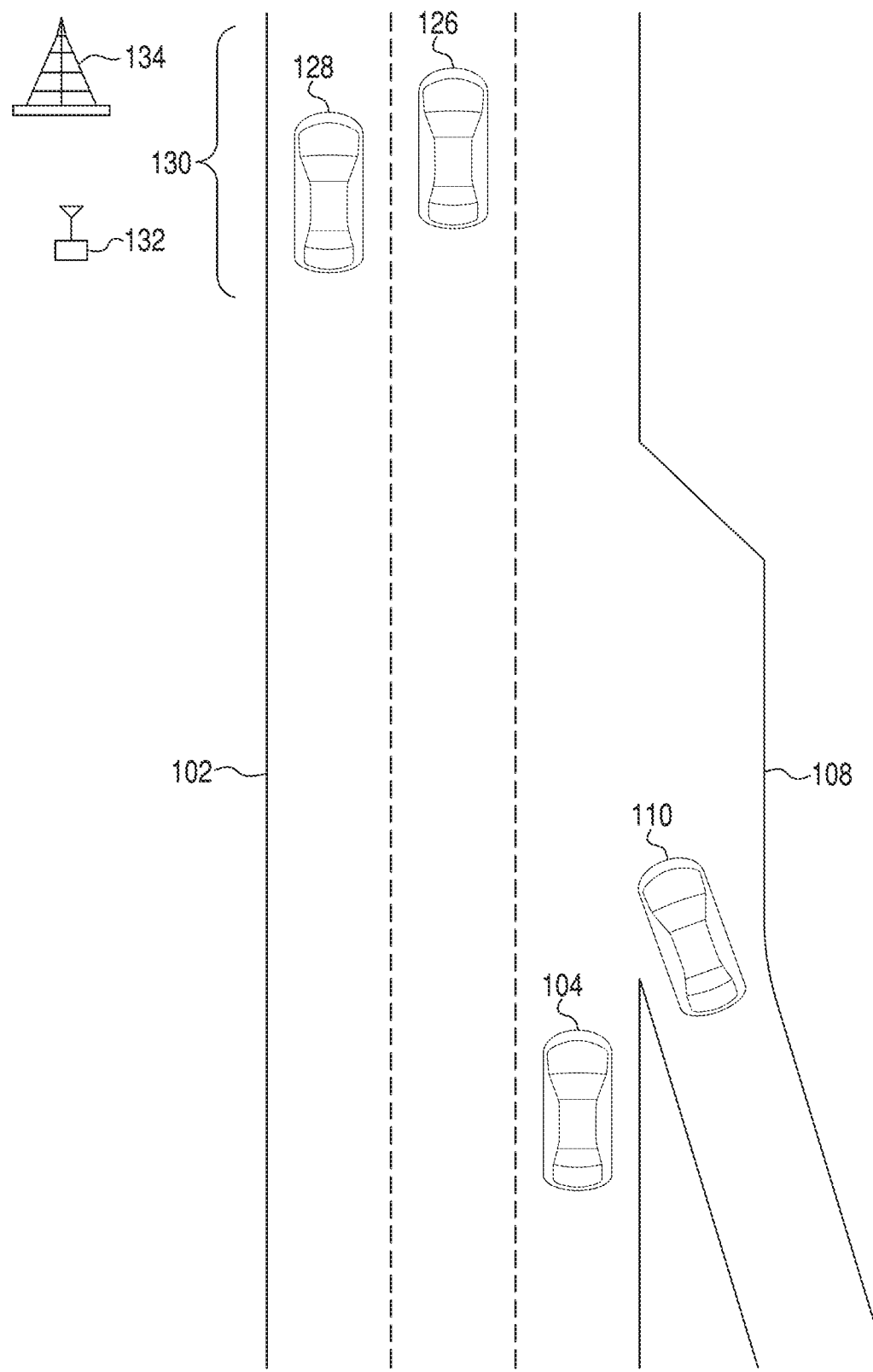
FIG. 10 is a schematic of a third traffic scenario for illustrating the adaptive cruise control system of FIG. 4 as a remote vehicle merges into light traffic.

In block 722, if the merge assist calculator 420 determines a likelihood that preceding traffic 130 will not slow the merging remote vehicle 110, the method 700 proceeds to block 728 that is disclosed in relation to FIG. 10.

FIG. 10 is a third traffic scenario 1000 to illustrate the embodiments using the transportation infrastructure of FIG. 1 and the vehicle communication network 200 of FIG. 2. In the third traffic scenario 1000, relatively light traffic 130 is traveling on roadway 102 as compared to the first traffic scenario 800 second traffic scenario 900. Vehicle data for traffic vehicle 126 can be collected via V2V communications, and data for the fifth traffic vehicle 128 can be collected using radar system 520 or other sensors. As remote vehicle 110 merges in front of host vehicle 104, a typical vehicle driving system may detect remote vehicle 110 in close proximity of host vehicle 104 and automatically actuate decelerate the host vehicle 104.

To address these and other problems, in block 728, merge assist calculator 420 determines the speed of traffic 130 and whether the remote vehicle 110 is accelerating during the entire duration of the merge. If the remote vehicle 110 ceases accelerating, then in block 730 the merge event detection component 428 continues to detect and monitor the speed, heading, and movement of remote vehicle 110 via V2V communications. Based on the real time data, merge assist calculator 420 can determine if other actions may be necessary to avoid a collision with remote vehicle 110.

If the remote vehicle 110 continues to accelerate ahead of host vehicle 104, then in block 732 the merge assist calculator 420 uses the real time V2V data to determine that the merging remote vehicle 110 will move ahead of host vehicle 104 without being impeded by traffic 130. Analysis of the traffic conditions can be performed by any known method including Bayesian statistics described above. In block 734, computer system 404 instructs ACC System 400 to automatically suppress the brake system of the host vehicle 104 while remote vehicle accelerates away from the host vehicle 104. The suppression of the host vehicle's brake system is counterintuitive to actions of typical vehicle control systems that would slow host vehicle 104 as it approaches behind remote vehicle 110. However, since the computer system 404 anticipates that the speed and sparse volume of traffic 130 will not impede the acceleration of remote vehicle 110 during the merge, the ACC system 400 can maintain the current speed of host vehicle 104. As described in block 730, the ACC system 400 can continue monitoring remote vehicle 110 via V2V communications and vehicle event sensor system 434 in order to respond to any deceleration or unexpected vehicle movements during the duration of the merge.

Alternatively or simultaneously, in block 734 the computer system 404 can issue a warning or alert on display device 426 to advise the operator of host vehicle 104 to change the current lane or path to a lane or path that is less likely to be affected by remote vehicle 110.

VII. Detecting and Warning a Tailgating Vehicle

The embodiments include an exemplary system and method for detecting a tailgating vehicle (e.g., a tailgater) as well as systems and methods that can be utilized in responding to the tailgater. In the following disclosure, a tailgating vehicle is intended to cover or otherwise refer to a vehicle following the subject vehicle and separated by a distance that is sufficiently small to warrant further analysis for various reasons. For example, as disclosed below, it may be beneficial to avoid immediate and hard braking of the subject vehicle to reduce the likelihood of the following vehicle rear ending the subject vehicle.

In an embodiment, a tailgating vehicle disposed in the same lane (or otherwise generally longitudinally aligned, or aligned in the same direction of travel), but behind the host vehicle 104 can be detected as a tailgater based on one or more factors, such as distance between the vehicles and/or a speed threshold. After a potential tailgating vehicle has been detected, the ACC system 400 of the host vehicle 104 may provide one or more notifications to the tailgating vehicle that include visual indicators from one or more brake light profiles that can be perceived as a warning to a driver of the tailgating vehicle that the vehicle is in fact tailgating.

As disclosed above, the ACC system 400 may also detect, using merge event detection component 428, that the remote vehicle 110 is traveling on entrance ramp 108. Calculations of a predicted path of travel of remote vehicle 110 can be made by merge assist calculator 420 using Bayesian statistics or any known method. If the remote vehicle 110 is predicted to merge into the path directly in front of the host vehicle 104, then the ACC computer system 404 can define the remote vehicle 110 as a potential lead vehicle. If the remote vehicle 110 merges directly in front of the host vehicle 104, then the ACC computer system defines the remote vehicle 110 as the lead vehicle.

After a tailgating vehicle and a lead vehicle (the remote vehicle 110) have been detected and defined, the ACC computer system 404 can determine a safe time headway distance between the host vehicle 104 and the remote vehicle 110. The ACC system 400 can thereby control a deceleration of the host vehicle 104 to increase the time headway to a safe following distance, as described more fully below.

Headway can be defined as the distance between a first vehicle and a second vehicle in front of the first vehicle on a road or path. A time headway distance can be defined as a measurement of the time past a set point between a first and second vehicle on the road or path. The time headway distance calculations of the embodiments can include preset times and/or distances that can be selectively determined based upon one or more factors that can affect braking distance and/or driver reaction time for braking such as but not limited to speed (e.g., slower speeds require less distance to stop), road conditions (e.g., snow or water covered roads 102 can require more time to stop), weather conditions (e.g., rain can affect driver perception), road topography (e.g., curves or hills can require more lead time to stop), etc., or any other condition that can affect vehicle braking and/or driver reaction. For example, a safe time headway distance can depend on one or more adaptive factors, such as but not limited to a tailgating vehicle speed, the host vehicle 104 speed, the remote vehicle 110 speed, and a distance between the host vehicle and the remote vehicle 110.

Increasing the time headway distance can result in a longer following distance to the lead vehicle from a host vehicle that will enable greater lead time for the host vehicle to begin braking in the event of a slowdown. As a result, the tailgater can be provided with the opportunity to perceive the visual indicators and advantageously have more lead time to slow down in the event of hard braking by the host vehicle 104, thereby preventing or reducing surprise and a potential rear-end collision.

The data component 412 of the ACC computer system 404 can store tailgater data including speed, detection, predetermined threshold distance and speed data, brake light profiles, and other additional data. The data 412 can include calculations for various preset and/or adaptive distance and speed thresholds. In an embodiment, a tailgater may be detected by one or more threshold distances $WD_n$ (warning distance). In an example, the one or more warning distances could be multipliers of a vehicle length. In another example, the one or more warning distances may depend on a distance required to brake at a certain speed as determined by government, commercial, and/or empirical data. The threshold warning distances $WD_n$ may be selectively determined based upon one or more factors that can affect braking distance and driver reaction time for braking as described above.

Exemplary embodiments are intended to cover execution of operations described above and illustrated in the figures, and various operations described below. Some of the steps in the embodiments can be omitted, as desired, or executed in a different order than the order of steps described herein.

As described above, the ACC system 400 of the host vehicle 104 can detect and define other vehicles on the road 102. The ACC system 400 may use one or more sensors of the vehicle subsystem sensor system 430, such as one or more of the radar system 520, camera 522, and laser 524, disposed at any beneficial area of host vehicle 104 that can detect and monitor vehicles disposed in front of, or behind, the host vehicle 104 in a traffic lane. The host vehicle 104 can also receive DSRC V2V signals providing location, speed, trajectory information, etc. from other DSRC enabled vehicles disposed in front of, or behind, the host vehicle 104. Using the data collected from the above sensors and/or systems, the ACC computer system 404 can calculate locations, relative distances, trajectory, speeds, acceleration, etc. of other vehicles on the road 102.

Figure 11:
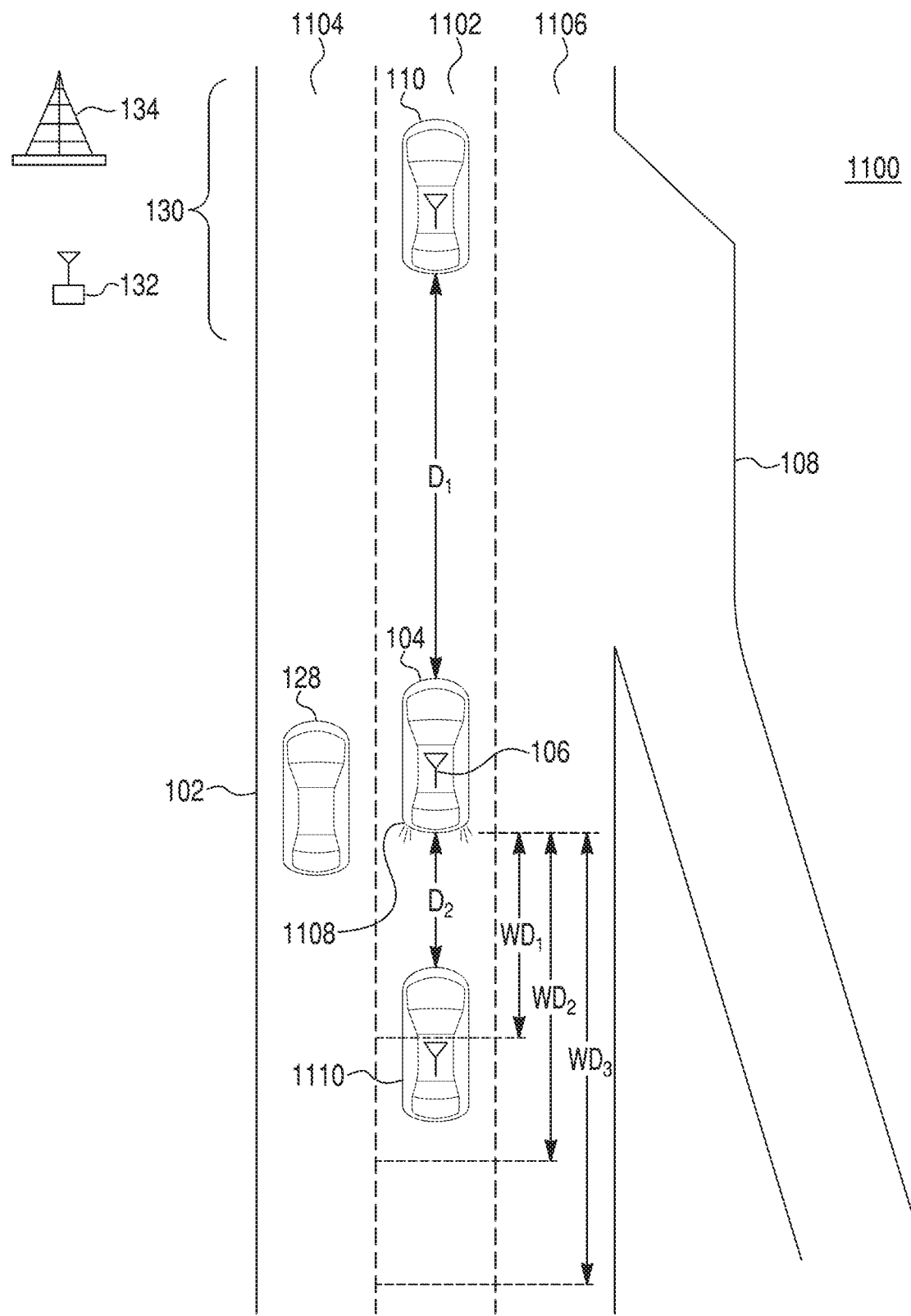
FIG. 11 is a schematic of a fourth traffic scenario for illustrating the adaptive cruise control system of FIG. 4, which is directed to detecting and responding to a tailgating vehicle.

FIG. 11 is a schematic of a fourth traffic scenario for illustrating the adaptive cruise control system of FIG. 4, which is directed to detecting and responding to a tailgating vehicle.

The fourth traffic scenario 1100 can utilize the transportation infrastructure of FIG. 1 and the vehicle communication network of FIG. 2. The fourth traffic scenario 1100 can include a center lane 1102, within which the host vehicle 104, the remote vehicle 110 (e.g., lead vehicle), and the tailgating vehicle 1110 (e.g., tailgater) travel thereon. In the embodiment, the host vehicle 104 is driving with the ACC computer system 404 activated. The ACC computer system 404 can detect the remote vehicle 110 and the tailgating vehicle 1110 using sensor data received from the vehicle event sensor system 434 that operationally controls the vehicle sensor system 516 and the host vehicle's various sensors. If vehicles are equipped with DSRC systems, then the host vehicle 104 can communicate DSRC V2V signals with the remote vehicle 110 and the tailgating vehicle 1110 and to receive vehicle data.

The ACC computer system 404 can detect a vehicle that could be a possible tailgater to the host vehicle 104 and determine whether the possible tailgater is actually tailgating the host vehicle 104. Detection of the tailgating vehicle 1110 can include vehicles that are in the same lane 1102 as the host vehicle 104 but disposed behind the host vehicle 104. In the scenario 1100, after merging onto the road 102, the remote vehicle 110 is disposed in front of the host vehicle 104, and the tailgating vehicle 1110 is disposed behind the host vehicle 104 in lane 1102. As detailed more fully below, the ACC computer system 404 can detect whether the tailgating vehicle 1110 is a potential tailgating vehicle and determine whether the tailgating vehicle 1110 is actually a tailgater. This can include the ACC computer system 404 determining or preselecting various distances based between the host vehicle 104 and the tailgating vehicle 1110 as threshold distances that can be adaptable based on speed or other factors listed herein.

The distance D2 between the host vehicle 104 and the tailgating vehicle 1110 can be defined as one or more warning distances that can: a) determine whether a potential tailgater is a tailgating vehicle, and b) determine what type of visual notification can be displayed to a tailgating vehicle as a warning to the driver. The distance D2 can be measured between the vehicles' closest point of contact in the case of a potential collision, i.e., from a rear bumper of the host vehicle 104 to a front bumper of the tailgating vehicle 1110.

As shown in FIG. 11, a warning distance can be defined as one or more threshold distances behind the host vehicle 104, which can include graduated distances behind the host vehicle 104. The ACC computer system 404 may define the threshold distances $WD_n$ as a function of speed, road conditions, vehicle braking factors, time between vehicles, etc., as described in relation to braking factors above. In an example, a threshold distance WD1 can be defined as a first time or distance, a threshold distance WD2 can be defined as a second time or distance, and WD3 can be defined as a third time or distance. In further example, a time can be calculated to constitute a time that it would take for the tailgating vehicle 1110 traveling a threshold speed $S_{TH}$ above the speed of the host vehicle 104 to come to a complete stop during a hard braking event.

The tailgating vehicle 1110 can be defined as a tailgater if the vehicle is disposed behind the host vehicle within one or more of the warning distances $WD_n$. The ACC computer system 404 can also determine if a potential tailgater is approaching the host vehicle 104 from behind at an increased rate of speed, for example a speed greater than the speed threshold $S_{TH}$, before the vehicle reaches a tailgating distance threshold, for example warning distance WD2. The warning distance WD3 can be selected at a greater relative distance than the distances WD1 and WD2. If the tailgating vehicle 1110 is traveling in lane 1102 at or above the speed threshold $S_{TH}$ and crosses the selective warning distance WD3, then the tailgating vehicle 1110 can be defined as a tailgating vehicle based on the increased speed and disposition of quickly approaching the host vehicle 104 from behind.

After the tailgating vehicle 1110 has been defined as a tailgater, the ACC computer system 404 can preemptively increase the headway distance D1 between the host vehicle 104 and the remote vehicle 110 to a predetermined distance. In this scenario, the distance D1 can be calculated by any known or future-developed algorithms by the ACC computer system 404 with factors that include, but are not limited to, host vehicle 104 speed, remote vehicle 110 speed, tailgating vehicle 1110 speed, the warning distance between host vehicle 104 and the tailgating vehicle 1110, a road load of the host vehicle 104, road grade, etc. By preemptively increasing the following distance D1 after detection of the tailgating vehicle 1110, if hard braking occurs by the lead/remote vehicle 110, the ACC computer system 404 can advantageously apply less braking force to, and/or decelerate, the host vehicle 104. Alternatively, the increase in following distance D1 advantageously provides a driver of the host vehicle 104 additional time to apply a braking force and/or decelerate in reaction to hard braking by the remote vehicle 110. An increase of the following distance D1 when the tailgating vehicle 1110 is detected can also be beneficial to the tailgating vehicle 1110. The lighter braking force that can be applied by the host vehicle 104 in reaction to hard braking by the remote vehicle 100 can provide the tailgating vehicle 1110 additional time to react to hard braking event, thereby reducing risk of a collision.

In the scenario in FIG. 11, if the remote vehicle 110 initiates hard braking, the ACC computer control system 404 can execute a braking command or alternatively execute a deceleration command to the host vehicle 104, which can be executed by mechanical systems to slow the host vehicle 104. Based on an amount of braking force or deceleration by the host vehicle 104, the ACC control system 404 can provide one or more indicators of the braking or deceleration to any vehicle to the rear of the host vehicle 104, such as the tailgating vehicle 1110. For example, a notification of hard braking by the remote vehicle 110 and/or braking or deceleration by the host vehicle 104 could be transmitted by the ACC computer system 404 to the host vehicle's display device 610 as a visual warning on screen or audible warning from a speaker. In another example, a notification of hard braking by the remote vehicle 110 and/or braking or deceleration by the host vehicle 104 could be transmitted by the ACC computer system 404 to the tailgater's DSRC system as a visual warning on screen or audible warning from a speaker. In an alternative embodiment, another example of a visual warning indicator can include an external indicator that includes, but is not limited to, one or more lights, such as brake lights, that can be oriented to illuminate towards the rear of the host vehicle 104 in order to gain the attention of a driver of the tailgating vehicle 1110. In other alternative embodiments, one or more profiles of an external indicator can include increasing or decreasing the intensity of the brake lights, increasing or decreasing the number of light sources in a multi-light source brake light, etc. This increase or decrease in an intensity of warning indicators can depend upon, for example, amount of hard braking by the remote vehicle 104, an amount of braking or deceleration by the host vehicle 104, a tailgating data factor, such as a distance D2 of the tailgating vehicle 1110 to the host vehicle 104, or any other factor that could be beneficial to provide a warning the tailgating vehicle 1110. In an embodiment, an increase in a number of indicator lights can indicate stronger braking by the host vehicle 104.

Figure 12A:
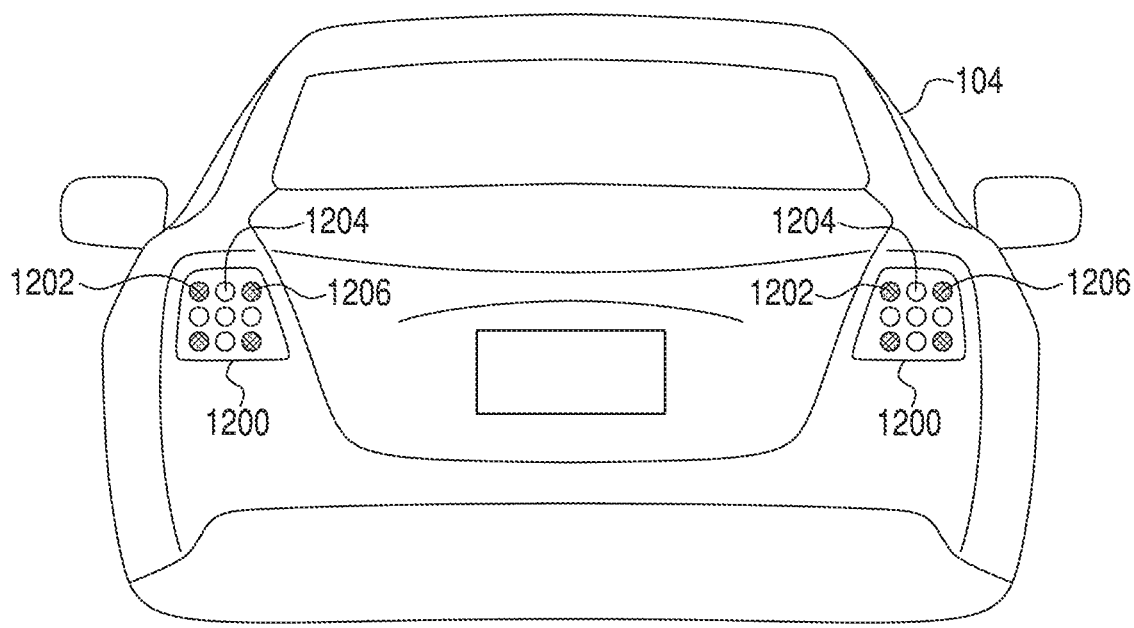
Figure 12B:
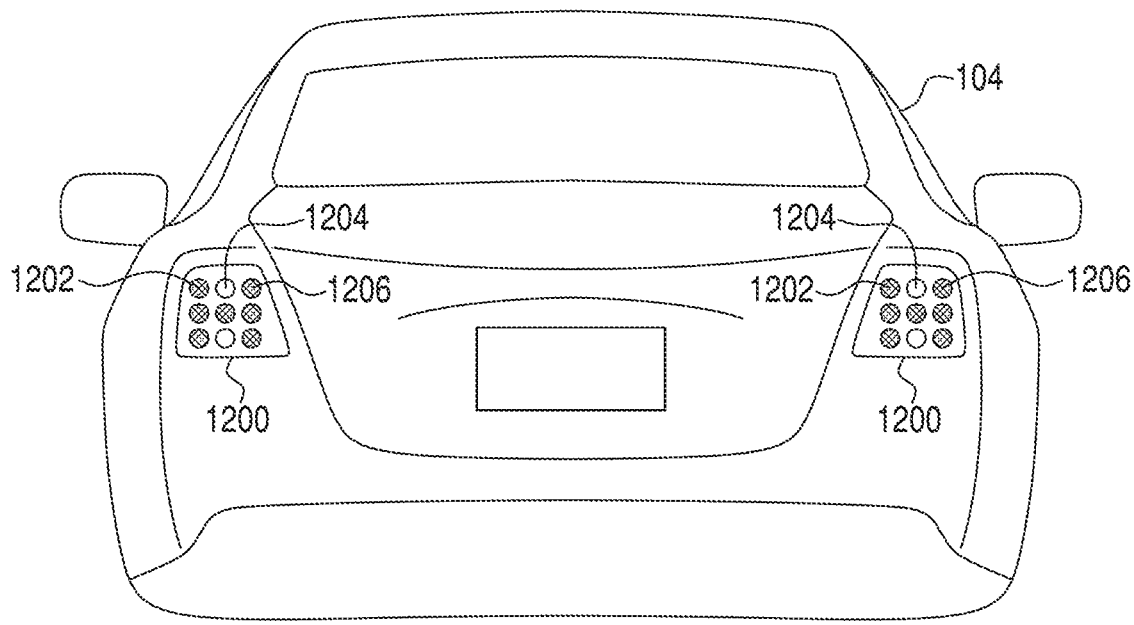

FIGS. 12A, 12B, and 12C are schematics of a rear of the host vehicle 104 displaying various warning indicators. In the alternative embodiments for displaying warning indicators towards the rear of the host vehicle 104, the host vehicle 104 can include a pair of rear brake lights 1200. Each brake light 1200 can include a preconfigured set of individual lights (e.g., LED lights, incandescent lights, etc.) arranged in a pattern (e.g., three rows by three column matrix). Each brake light 1200 can include a first column of lights 1202, a second column of lights 1204, and a third column of lights 1206. The number of lights and arrangement are merely exemplary, and the alternative embodiments can include greater or fewer lights arranged in any arrangement that can be used to execute functions of the warning profiles. In one profile example, the profiles of flashing brake light intensity can correspond to the remote vehicle 110 being defined as a tailgater disposed within one or more of the threshold warning distances $WD_n$, speed of the tailgating remote vehicle 110, or any corresponding tailgating data as desired.

In a first profile for a minimum warning indicator illustrated in FIG. 12A, the light columns 1202 and 1206 can begin flashing two of three individual lights, and a third column 1204 does not flash. In a second profile for a medium warning indicator illustrated in FIG. 12B, the light columns 1202 and 1206 can flash all of the individual lights and the third column 1204 can flash a single individual light. In a third profile for a maximum warning indicator illustrated in FIG. 12C, all lights in columns 1202, 1204, and 1206 can flash as the warning indicator.

Once the tailgating vehicle 1110 has been detected and defined, and the ACC computer system 404 detects whether the remote vehicle 110 is disposed in front of the host vehicle 104 in lane 1102, and the ACC computer system 404 can automatically and preemptively increase the time headway distance D1 between the host vehicle 104 and the remote vehicle 110. The increased time headway distance results in a longer following distance from the remote vehicle 110. In a situation of a hard braking event produced by the remote vehicle 110, the increased time headway can enable the host vehicle 104 to start braking sooner, which can give more time to the tailgating vehicle 1110 to react and start slowing down as well, thus preventing a surprise and potential rear-end collision.

In the embodiments, the ACC system 400 controls can be actively modified based on tailgating data during an event. If tailgating vehicle 1110 is tailgating, then the ACC system 400 can react with a quicker response than a human driver and will not require a higher deceleration of the host vehicle 104, thereby preventing (or reducing the likelihood of) a potential rear-end collision. In an alternative embodiment, if the ACC system 400 is not operational, then a forward collision warning can be quickly displayed to the host vehicle driver so as to warn the host vehicle driver to react earlier to the remote vehicle 110 and thereby prevent hard braking. The ACC computer system 404 operation can be combined with constantly updated time headway distance data D1 when the remote vehicle 110 is disposed in front of the host vehicle 104, such that the smaller the time headway distance, or the higher deceleration of the remote vehicle 110, the tailgating warnings to the tailgating vehicle 1110 can become more aggressive.

Figure 13A:
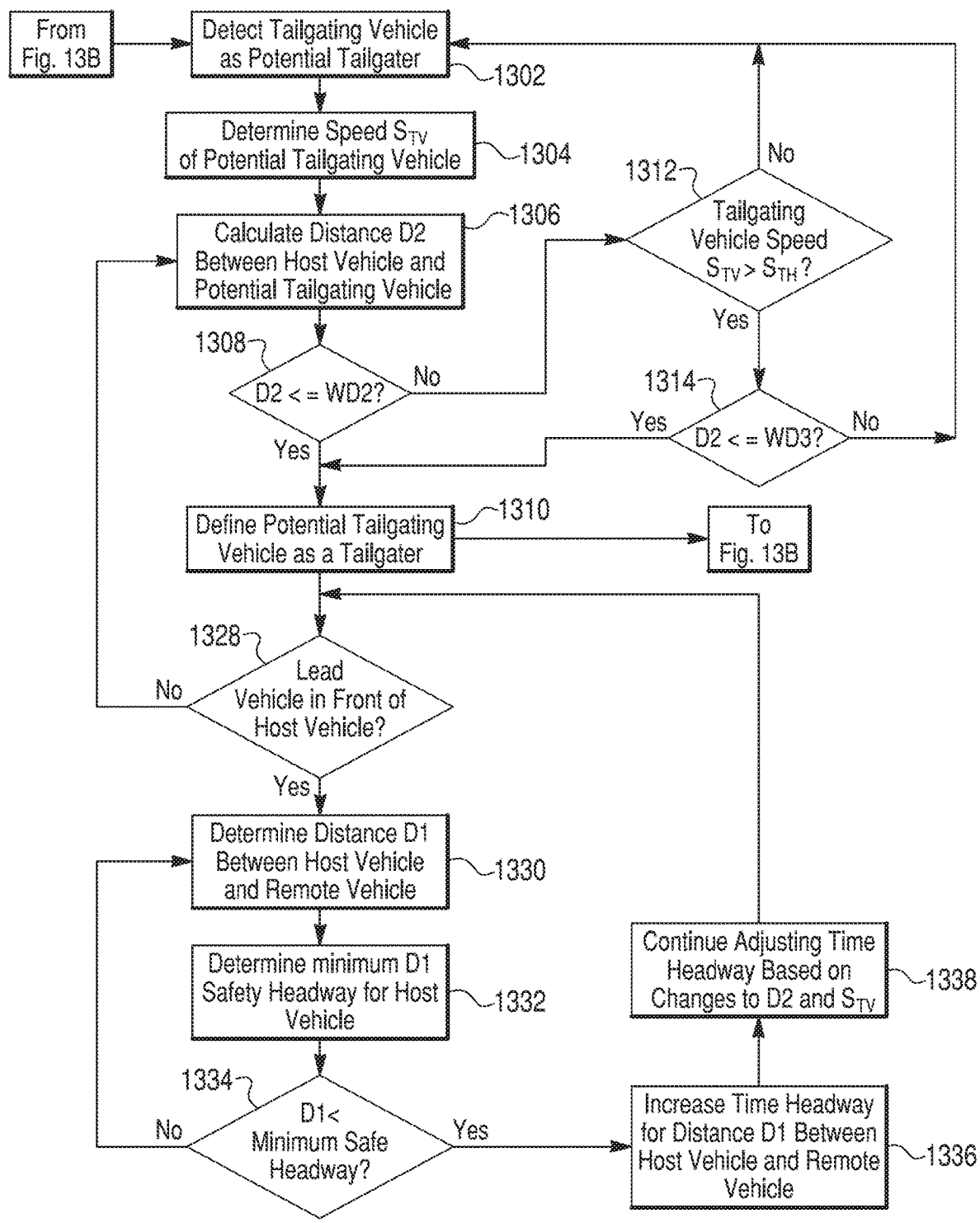
FIGS. 13A and 13B are exemplary flowcharts of an exemplary method to detect and react to a tailgating vehicle.
Figure 13B:
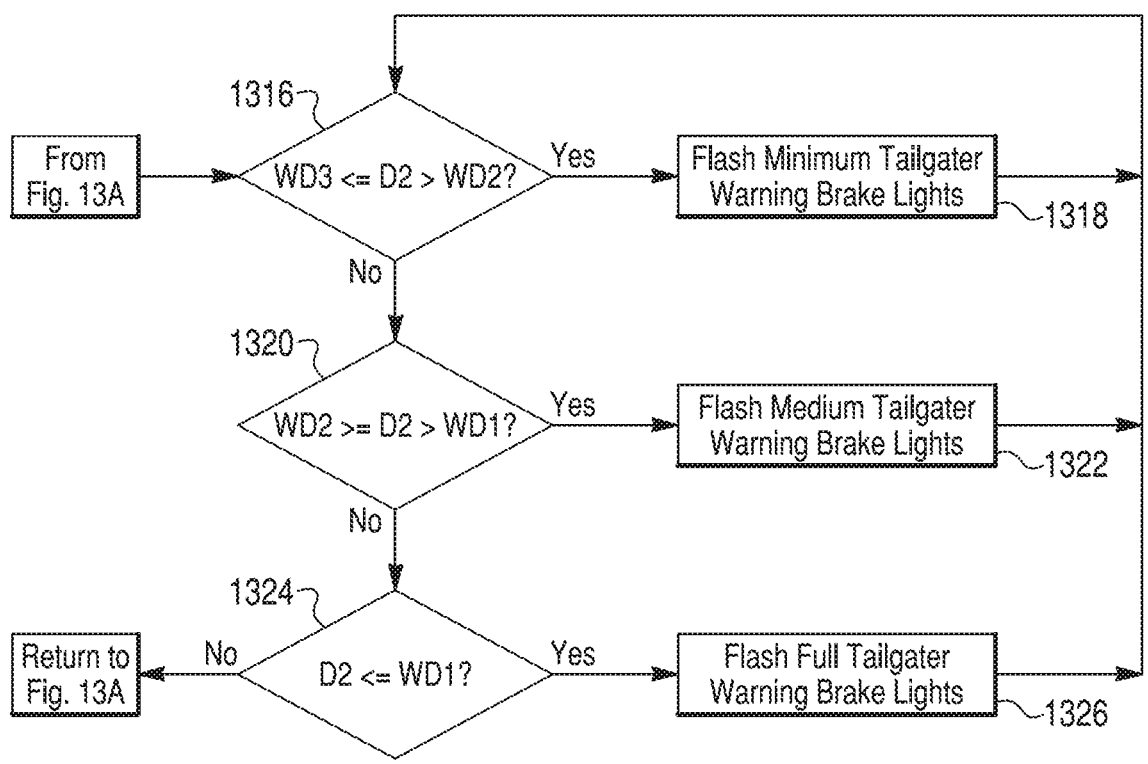

FIGS. 13A and 13B are exemplary flowcharts of an exemplary method to detect and react to the tailgating vehicle 1110. The steps of the exemplary method 1300 may be performed by the ACC system 400 of the host vehicle 104. In this example, in block 1302, the ACC computer system 404 can detect the tailgating vehicle 1110 as a potential tailgater. At block 1304, the speed $S_{TV}$ of the tailgating vehicle 1110 can be determined using one of the methods described above including but not limited to DSRC communications. In block 1306, the ACC computer system 404 can calculate a distance D2 between the host vehicle 104 and the potential tailgating vehicle 1110. In block 1308, the ACC computer system 404 can calculate if the distance D2 is less than or equal to the threshold warning distance WD2. If yes, then in block 1310 the potential tailgating vehicle 1110 is defined as a tailgater. If no, then in block 1310 the ACC computer system 404 can determine if the tailgating vehicle 1110 speed $S_{TV}$ is greater than a threshold increased speed $S_{TH}$. If no, then the operation returns to block 1302 to detect the tailgating vehicle 1110 as a potential tailgater. If yes, then in block 1314 the ACC computer system 404 can determine if the distance D2 is less than or equal to warning distance WD3. If yes, the operation proceeds to block 1310 to define the tailgating vehicle 1110 as a tailgater since the current speed of the tailgating vehicle 1110 $S_{RV}$ is high enough that a quick approach by the tailgating vehicle 1110 to the rear of the host vehicle 104 is impending.

In the alternative embodiments, once the tailgating vehicle 1110 has been defined as a tailgater, then the operation can proceed to FIG. 13B to issue warnings to the tailgating vehicle 1110. In block 1316, the ACC computer system 404 can determine if the tailgating vehicle 1110 has crossed a threshold warning distance WD3 by calculating if D2 is less than or equal to WD3 but greater than WD2. If yes, then the ACC computer system 404 can initiate a minimum warning profile in block 1318 by flashing the minimum tailgater warning brake lights as described for FIG. 12A. Thereafter, the operation returns to block 1316. If no, then in block 1320 the ACC system can determine if the tailgating vehicle 1110 has crossed the threshold distance for warning distance WD2 by calculating if distance D2 is less than or equal to warning distance WD2 but greater than warning distance WD1. If yes, then the ACC computer system 404 can initiate a medium warning profile in block 1322 by flashing the medium tailgater warning brake lights as described for FIG. 12B. Thereafter, the operation returns to block 1316. If no, then in block 1324 the ACC system can determine if the tailgating vehicle 1110 has crossed the threshold distance for warning distance WD1 by calculating if distance D2 is less than or equal to warning distance WD1. If yes, then the ACC computer system 404 can initiate a maximum warning profile in block 1326 by flashing the maximum tailgater warning brake lights as described for FIG. 12C. Thereafter, the operation returns to block 1316. If no, then the tailgating vehicle 1110 is no longer in a tailgating disposition and the operation returns to block 1302 to detect a potential tailgater.

Returning to block 1310, after the tailgating vehicle 1110 has been defined as a tailgater; the operation simultaneously, or alternatively, proceeds to block 1328 to determine if the remote vehicle 110 is disposed in front of the host vehicle 104 as a lead vehicle. If yes, then in block 1330 the ACC computer system 404 can determine the time headway distance D1 between the host vehicle 104 and the remote vehicle 110. In block 1332, the ACC computer system 404 can determine, based on tailgating data 412, a minimum safe headway distance D1 for the host vehicle 104. In block 1334, the ACC computer system 404 can calculate if the current distance D1 is less than the minimum safe time headway distance. If no, then the curdirent D1 is a safe time headway distance, and the operation can return to block 1330 to monitor the distance D1. If yes, then the current D1 distance is unsafe, and in block 1336 the ACC system 400 can automatically increase the time headway distance D1 by decelerating or braking the host vehicle 104 gradually to a safe time headway distance. In block 1338, the ACC computer system 404 can continue to monitor and adjust the time headway distance D1 based on changes to distance D2, tailgating vehicle 1110 speed $S_{TV}$, or any other data 412. The operation can return to block 1328 to determine if the remote vehicle 110 is disposed in the lane 1102 ahead of host vehicle 104. If the remote vehicle 110 is not disposed ahead of the host vehicle 104, then the operation can return to block 1306 to continue monitoring and calculating the distance D2 between the host vehicle 104 and the tailgating vehicle 1110.

The above described techniques may take the form of computer or controller implemented processes and apparatuses for practicing those methods. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the embodiments. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the embodiments. When implemented on a general-purpose microprocessor, the computer program code segments configure the microprocessor to create specific logic circuits.

VIII. Alternative Embodiments

While certain embodiments of the invention are described above, and FIGS. 1-13B disclose the best mode for practicing the various inventive aspects, it should be understood that the invention can be embodied and configured in many different ways without departing from the spirit and scope of the invention.

In an alternative embodiment, instead of predicting the remote vehicle 110 merging onto road 102 in front of the host vehicle 104, the ACC computer system 404 can detect any vehicle from the traffic 130 that becomes disposed directly in front of the host vehicle 104. In an example, the remote vehicle 110 may merge ahead of traffic 130, thereby slowing traffic 130 behind the remote vehicle 110. The host vehicle 104 may travel at a greater speed than traffic 130 and therefore encounter one of the second traffic vehicle 118, third traffic vehicle 122, or fifth traffic vehicle 128, instead of the remote vehicle 110. The ACC computer system could therefore determine if one of these traffic vehicles is disposed in front of the host vehicle 104 and define the traffic vehicle as a lead vehicle in step 1328.

Exemplary embodiments are intended to include or otherwise cover any type of vehicle-to-vehicle, vehicle-toexternal, vehicle-to-everything, peer-to-peer, or one-to-many communication network. In other words, exemplary embodiments are intended to cover any application of a communications network between vehicles, bicycles, motorcycles, pedestrians, processors, servers, controllers, infrastructure, etc. disclosed above.

Exemplary embodiments are intended to cover execution of method steps on any appropriate specialized or general purpose server, computer device, or processor in any order relative to one another. Some of the steps in the embodiments can be omitted, as desired.

Exemplary embodiments are intended to cover using service provider 212 as a remote ACC computer system 404. Service provider 212 may include the same or substitute components and perform the same or similar functions as the computer system 404. ACC system 400 may collect, analyze, and store data 412 in real time during a traffic merge event. The data 412, analysis, and predictions may be uploaded and stored in service provider server 214 for access and use by host vehicle 104 or other vehicles. Further, service provider memory 220 can perform analysis in real time for host vehicle 104 based on data uploaded to service provider 212 by any vehicle and/or infrastructure associated a traffic merge of the embodiments. In this configuration, the computer system 404 can function as a "thin client" system gathering and transmitting data for host vehicle 104 for upload to server 214.

The service provider 212 can perform computer system 404 analyses and transmit predictions and ACC system instructions and/or informing alerts through one-to-many communication network 222 back to host vehicle 104. Each vehicle connected to vehicle communication network 200 can transmit data to and receive information from service provider 212. An advantage to the alternative embodiment is that ACC systems in each DSRC configured vehicle may be centrally controlled, which can provide for greater coordination and cooperation between ACC systems in vehicles during a traffic merge or other traffic related events.

A computer architecture of the embodiments may be a general purpose computer or a special purpose computer. A computer can be used to implement any components of the ACC system 400 or the methods of the embodiments. For example, components of computer system 404 can be implemented on a computer via its hardware, software program, firmware, or a combination thereof. Although individual computers or servers are shown in the embodiments, the computer functions relating to computer system 404 may be implemented in a distributed fashion on a number of similar platforms, to distribute the processing and/or functional load.

Embodiments are also intended to include or otherwise cover methods of using and methods of manufacturing the ACC system 400 disclosed above. The methods of manufacturing include or otherwise cover processors and computer programs implemented by processors used to design various elements of the ACC system 400 above. For example, embodiments are intended to cover processors and computer programs used to design or test the ACC system 400.

Exemplary embodiments are intended to cover all software or computer programs capable of enabling processors to implement the above operations, designs and determinations. Exemplary embodiments are also intended to cover any and all currently known, related art or later developed non-transitory recording or storage mediums (such as a CD-ROM, DVD-ROM, hard drive, RAM, ROM, floppy disc, magnetic tape cassette, etc.) that record or store such software or computer programs. Exemplary embodiments are further intended to cover such software, computer programs, systems and/or processes provided through any other currently known, related art, or later developed medium (such as transitory mediums, carrier waves, etc.), usable for implementing the exemplary operations disclosed above.

These computer programs can be executed in many exemplary ways, such as an application that is resident in the memory of a device or as a hosted application that is being executed on a server and communicating with the device application or browser via a number of standard protocols, such as TCP/IP, HTTP, XML, SOAP, REST, JSON and other sufficient protocols. The disclosed computer programs can be written in exemplary programming languages that execute from memory on the device or from a hosted server, such as BASIC, COBOL, C, C++, Java, Pascal, or scripting languages such as JavaScript, Python, Ruby, PHP, Perl or other sufficient programming languages.

Embodiments are amenable to a variety of modifications and/or enhancements. For example, although the implementation of various components described above may be embodied in a hardware device, it can also be implemented as a software-only solution, e.g., an installation on an existing server. In addition, systems and their components as disclosed herein can be implemented as a firmware, firmware/software combination, firmware/hardware combination, or a hardware/firmware/software combination.

Some of the disclosed embodiments include or otherwise involve data transfer over a network, such as communicating various inputs over the network. The network may include, for example, one or more of the Internet, Wide Area Networks (WANs), Local Area Networks (LANs), analog or digital wired and wireless telephone networks (e.g., a PSTN, Integrated Services Digital Network (ISDN), a cellular network, and Digital Subscriber Line (xDSL)), radio, television, cable, satellite, and/or any other delivery or tunneling mechanism for carrying data. A network may include multiple networks or sub-networks, each of which may include, for example, a wired or wireless data pathway. The network may include a circuit-switched voice network, a packet-switched data network, or any other network able to carry electronic communications. For example, the network may include networks based on the Internet protocol (IP) or asynchronous transfer mode (ATM), and may support voice using, for example, VoIP, Voice-over-ATM, or other comparable protocols used for voice data communications. In one implementation, the network includes a cellular telephone network configured to enable exchange of text or SMS messages.

Examples of a network include, but are not limited to, a personal area network (PAN), a storage area network (SAN), a home area network (HAN), a campus area network (CAN), a local area network (LAN), a wide area network (WAN), a metropolitan area network (MAN), a virtual private network (VPN), an enterprise private network (EPN), Internet, a global area network (GAN), and so forth.

While the subject matter has been described in detail with reference to exemplary embodiments thereof, it will be apparent to one skilled in the art that various changes can be made, and equivalents employed, without departing from the scope of the invention.

What is claimed is:

1. A vehicle control system for use with a host vehicle configured for travel along a path, the vehicle control system comprising:
   a processor that is configured to:
   access a host location and a host speed of the host vehicle;

detect a follower location and a follower speed of a following vehicle behind the host vehicle on the path;

calculate a tailgating distance between the host vehicle and the following vehicle;

identify a first warning distance extending from the rear of the host vehicle in a longitudinal direction and a second warning distance extending from the rear of the host vehicle in the longitudinal direction, wherein the second warning distance is greater than the first warning distance;

compare the tailgating distance to the first warning distance and the second warning distance;

determine the tailgating distance is greater than the first warning distance and less than or equal to the second warning distance;

identify the following vehicle as a tailgating vehicle when the follower speed is greater than the host vehicle; and initiate a tailgating protocol of the host vehicle based on a differential speed between the host speed and the follower speed.

2. The vehicle control system of claim 1, wherein the tailgating protocol includes a visual indicator to be emitted from the host vehicle toward the tailgating vehicle.

3. The vehicle control system of claim 2, wherein the visual indicator is a flashing of one or more lights of the host vehicle, and wherein frequency of the flashing of the one or more lights is based on the differential speed.

4. The vehicle control system of claim 1, further comprising: detecting a lead vehicle ahead of the host vehicle on the path; and calculating a time headway distance between the host vehicle and the lead vehicle, wherein the tailgating protocol includes increasing the host speed based on the time headway distance.

5. The vehicle control system of claim 4, further comprising:

updating the time headway distance based on the follower speed and the tailgating distance.

6. A method of identifying a tailgating vehicle and controlling a host vehicle based on the identified tailgating vehicle for travel along a path, the method being implemented by a processor and a vehicle control system, the method comprising:

accessing a host location and host speed of the host vehicle;

detecting a follower location and follower speed of a following vehicle behind the host vehicle on the path;

calculating a tailgating distance between the host vehicle and the following vehicle;

identifying a first warning distance extending from the rear of the host vehicle in a longitudinal direction and a second warning distance extending from the rear of the host vehicle in the longitudinal direction, wherein the second warning distance is greater than the first warning distance;

comparing the tailgating distance to the first warning distance and the second warning distance;

identifying the following vehicle as a tailgating vehicle in response to the follower speed being greater than the host speed and the following vehicle being within the second warning distance and the tailgating distance being greater than the first warning distance; and initiating a tailgating protocol of the host vehicle based on a differential speed between the host speed and the follower speed.

7. The method of claim 6, wherein the tailgating protocol includes a visual indicator to be emitted from the host vehicle.

8. The method of claim 7, wherein the visual indicator is a flashing of one or more lights of the host vehicle, and wherein frequency of the flashing of the one or more lights is based on the differential speed.

9. The method of claim 6, further comprising:

detecting a lead vehicle ahead of the host vehicle on the path; and calculating a time headway distance between the host vehicle and the lead vehicle, wherein the tailgating protocol includes increasing the host speed based on the time headway distance.

10. The method of claim 9, further comprising:

updating the time headway distance based on the follower speed and the tailgating distance.

11. A vehicle control system for use with a host vehicle configured for travel along a path, the vehicle control system comprising:

a processor that is configured to:

accessing a host location and host speed of the host vehicle;

detecting a follower location and follower speed of a following vehicle behind the host vehicle on the path;

calculating a tailgating distance between the host vehicle and the following vehicle;

identifying a first warning distance extending from the rear of the host vehicle in a longitudinal direction and a second warning distance extending from the rear of the host vehicle in the longitudinal direction, wherein the second warning distance is greater than the first warning distance;

comparing the tailgating distance to the first warning distance and the second warning distance;

identifying the following vehicle as a tailgating vehicle in response to the follower speed being greater than the host speed and the following vehicle being within the second warning distance and the tailgating distance being greater than the first warning distance; and initiating a tailgating protocol of the host vehicle based on the differential speed.

12. The vehicle control system of claim 11, wherein the tailgating protocol includes a visual indicator to be emitted from the host vehicle.

13. The vehicle control system of claim 12, wherein the visual indicator is a flashing of one or more lights of the host vehicle, and wherein frequency of the flashing of the one or more lights is based on the differential speed.

14. The vehicle control system of claim 11, further comprising:

detecting a lead vehicle ahead of the host vehicle on the path;

calculating a time headway distance between the host vehicle and the lead vehicle, wherein the tailgating protocol includes increasing the host speed based on the time headway distance; and updating the time headway distance based on the follower speed and the tailgating distance.

* * * * *